United States Patent [19]

Emerson

[11] 3,743,793

[45] July 3, 1973

[54] ANALOG SIGNAL RECORDING AND PLAYBACK METHOD AND SYSTEM

[75] Inventor: Sidney Thomas Emerson, Port Jefferson, N.Y.

[73] Assignee: Periphonics Corporation, Rocky Point, N.Y.

[22] Filed: Jan. 26, 1971

[21] Appl. No.: 109,800

[52] U.S. Cl. .. 179/100.2 MD, 179/1 SA, 179/15 A, 340/152, 340/174.1 C

[51] Int. Cl. ........................ G11b 27/32, G11b 5/06

[58] Field of Search ..... 179/1 SA, 15 A, 100.2 MD; 340/152, 174.1 C, 174.1 G, 174.1 H, 174.1 P

[56] References Cited

UNITED STATES PATENTS

| | | | |
|---|---|---|---|
| 3,398,241 | 8/1968 | Lee | 179/1 SA |
| 3,248,718 | 4/1966 | Uemura | 179/15 A |

OTHER PUBLICATIONS

IBM Technical Disclosure Bulletin Vol. 6, No. 6, Nov. 1963 page 43.

*Primary Examiner*—J. Russell Goudeau
*Attorney*—Gottlieb, Rackman & Reisman

[57] ABSTRACT

Apparatus and method for recording and reproducing analog signals. When used in a voice response system, audio signals are sampled at approximately a 5 kHz rate, and the samples are recorded on the track of a magnetic disc or drum. The record medium makes a single rotation in less time than it takes to record or reproduce a word. Thus, the samples are recorded in an interlaced format on the record medium. By storing samples only, much less storage capacity is needed for each signal than in the case where the continuous signal is recorded. The interlacing technique allows fast random access to any signal and does not require the use of buffering circuits. The samples are recorded in the form of pulse widths to provide extremely dense packing of information. Many signal tracks, each having samples of many analog signals recorded in it, utilize a common timing track. This allows the decoder disclosed in application Ser. No. 57,489 to be simplified.

87 Claims, 11 Drawing Figures

INVENTOR.
S. THOMAS EMERSON

Gottlieb Rackman & Reisman
ATTORNEYS

Patented July 3, 1973

3,743,793

9 Sheets-Sheet 3

Patented July 3, 1973 3,743,793

9 Sheets-Sheet 8

ANALOG SIGNAL RECORDING AND PLAYBACK METHOD AND SYSTEM

This invention relates to information handling and signal transmission systems, and more particularly to voice response systems.

A voice response system typically includes a medium on which are recorded perhaps 100 vocabulary words. The system is generally controlled by a digital computer. A user makes a "call" to the computer and asks a question of it. The computer determines the necessary answer and controls the correct sequence of vocabulary words to be transmitted back to the caller.

For example, a brokerage firm might utilize a voice response system which contains recordings to the prices of stocks. The recordings might consist of the following words and phrases: one-hundred, two-hundred, . . . nine-hundred; ten, twenty, . . . ninety; one, two, . . . nine; and one-sixteenth, and two-sixteenths, . . . and fifteen-sixteenths. A caller would ask the computer to "quote" the price of a particular stock. Suppose the price is 126 3/16. The computer would control the playback of four successive recordings (one-hundred, twenty, six, and three-sixteenths) to the inquirer. An obvious advantage of such a system is that persons desiring to know the price of a stock need not call their brokers (unless they have other business to transact). All they need do is to "call" the brokerage firm's computer to get the desired information. Of course, at the brokerage firm the computer memory would have to be up-dated continuously as the price of each stock changes. But when the computer is interrogated as to the current price of a specific stock, the computer need only refer to its memory to determine the current price and then control the voice response system to direct the appropriate words to the caller.

There are many other applications for voice response systems. For example, many large manufacturing companies have large computer installations in which minute-to-minute events are recorded. A manager of a particular branch who might, for example, be interested in the current inventory of a particular part might call the computer and ask for the information by identifying the type of request (number in inventory) and the stock number. The computer would then control the playback of the appropriate sequence of words. Airline reservations can be handled in the same way; a clerk might ask whether any seats are available on a particular flight and would get back a verbal answer. He might then make a reservation and get back a verbal confirmation with whatever other verbal instructions are appropriate.

At the present time, access to a computer by a remote user is generally had over a data terminal. The data terminal usually includes a keyboard so that the user, after he "calls" the computer, can instruct the computer with the information requested. The data terminal also usually includes a display device such as a cathode-ray tube. The computer responds by transmitting digital information back to the data terminal which is converted to a visual display. The major problem with this type of man-machine interaction is that a data terminal costs thousands of dollars if purchased, and hundreds of dollars per month if leased. Many users do not require information frequently enough to justify the cost of a data terminal With a voice response system, however, in most cases no investment at all is required on the part of a user. Consider an invester who has a Bell System push-button telephone set. To determine information about a stock, all he must do is to first make an ordinary telephone call to his broker's computer. After he is connected to an appropriate interface unit, he must simply operate the correct keys to indicate the stock in which he is interested and the information about it which he wants. He then hears the answer and hangs up. (It is possible to interrogate the computer even with a suitably interfaced dial telephone set, although for speed of operation push-button sets are preferable.)

It is true that a voice response system cannot convey as much audible information in the same period of time that can be displayed visually at a data terminal. However, most users require only a limited amount of information and voice response systems are ideally suited for them. It has been estimated that sales of voice response systems will grow to hundreds of millions of dollars within the next few years.

It is often desirable to provide a large vocabulary, e.g., one-thousand words, and to simultaneously service a large number of lines, e.g., one-hundred lines. Furthermore, for maximum flexibility a voice response system should have an add-on capability, that is, it should be possible to add (or change) words to the vocabulary and increase the number of lines with minimal effort and expense.

A problem with present-day systems is that there is often an annoying pause between successive words in the same message. Typically, the same time interval (e.g., one-half second) is alloted to each word in a message. If a word is longer than this time interval it is carried over into the next interval. Since the same interval, or a multiple of it, is accorded to each word there is necessarily an arbitrary pause before each word that depends upon the length of the preceding word.

A typical prior art voice response system consists of 100 tracks on each of which is recorded a different word. The recording medium (magnetic drum, photographic film, etc.) rotates continuously and a read-out mechanism associated with each track continuously reads out the same word over and over again. Each user line can be connected by the computer through a switch to any one of the read-out mechanisms. (Several lines can be connected simultaneously to the same read-out mechanism so that several users can hear the same word at the same time.) The computer determines the word sequence for each line and operates the appropriate switches for each line in the correct sequence.

In the copending application of Emerson et al entitled "Analog Signal Recording and Playback Method and System", Ser. No. 57,489 filed on July 23, 1970 (which application is hereby incorporated by reference), there is disclosed a voice response system which can store a large vocabulary, can service a great number of lines, permits rapid random access to any word, facilitates simple signal multiplexing, allows vocabulary words to be changed easily, and eliminates the present-day pauses between successive words. In that system, several words are recorded on the same track. But unlike the prior art systems, an analog signal is not recorded for each word. Instead, a sampled signal is recorded. The orginal analog signal (word) is sampled approximately once every 200 microseconds. The amplitude of each sample is recorded on a track of a magnetic disc by varying the width of a pulse. The recording of the first word takes place as follows:

The track is first sub-divided into 167 segments. The number of segments in each track is selected such that, taking into consideration the speed of rotation of the disc, each segment passes the single record/read head associated with the track at the basic sampling rate (200 microseconds). The first sample of the signal is recorded at the beginning of the first segment — the width of the first pulse recorded in this segment corresponds to the amplitude of the sample. 200 microseconds later, when the leading edge of the second segment reaches the record/read head, the second sample of the same signal is recorded. This process continues until eventually 167 samples have been recorded in the track.

The 168th sample is recorded in the first segment, immediately following the first recorded sample. Again, the sample is then recorded by adjusting the width of a pulse. The 169th sample is then recorded immediately after the second sample (in the second segment). This process continues until after the second complete rotation of the disc 334 samples have been recorded. During the third pass, another 167 samples are recorded in the same manner. Eventually all samples from the signal are recorded, with several different-width pulses appearing in each segment on the track.

But the recording of these samples, even though they completely characterize a first signal (word) may not take up the entire track. Each segment has the capacity to record many samples, and yet maybe less than a dozen or so samples of the first signal may be recorded in each segment. A second signal (word) is recorded by starting the same process all over again — but beginning after the last sample recorded in each segment. For example, suppose that the first signal required 12 samples in each segment. The first sample of the second signal is recorded after the 12th sample in the first segment. The second sample of the second signal is recorded after the 12th sample in the second segment, etc. After the first pass during the recording of the second word, the 168th sample is recorded after the 13 samples already recorded in the first segment. This process goes on until all samples for the second signal have been recorded. In a similar manner, additional signals (words) may be recorded in any remaining space on the track.

To read out a particular word, all that is required is to read out the respective samples in the proper sequence. For example, suppose it is necessary to read out the second word. Furthermore, suppose that the second word, when recorded, required five samples in each segment (for a total of 5 × 167, or 835 samples). During the first rotation of the disc, the thirteenth sample in the first segment is first read out. This thirteenth sample (recorded after the first 12 samples which correspond to sample numbers 1, 168, 335, etc. of the first word) is the first sample of the second word. As the disc continues to rotate, the thirteenth sample in the second segment is read out, this sample being the second sample of the second word. In a similar manner, during the first rotation of the disc, the thirteenth sample in each segment is read out. Since samples are read out at the same rate at which they were recorded (approximately at intervals of 200 microseconds), it is apparent that the samples are read out at a fast enough rate to allow full reconstruction of the signal in accordance with signal sampling theory. After the first rotation of the disc, the 14th sample in each of the successive segments is read out during the second pass, etc. — until eventually the disc has made five rotations and all samples have been read out and the signal has been reconstructed and delivered to the caller. All that is required to read out a particular word is to know in which of the many tracks on the disc the word is recorded, the starting sample number in each segment of the track, and the total number of disc rotations required for all samples of the word to be read out.

The recording process is relatively simple. The selected track is sub-divided into a number of segments and the disc rotates at the fixed speed which causes each track segment to pass underneath the record head at the basic sampling rate. The amplitude of each sample results in the recording of a respective width pulse in the track. (It is apparent that while the segments pass the record head at intervals of 200 microseconds, the time at which each new pulse is recorded in a segment depends on the width of the pulses previously recorded in the same segment since the pulses are recorded in succession in every segment. However, the small variations around 200 microseconds between the recording of samples represents no loss of information, since it is not necessary when recording samples of a signal to record them at a precisely fixed rate. Moreover, subsequent read-outs of samples occur at the same time spacings as during the recording process; all that is required is to count the number of pulses in each segment and to read out the appropriate pulse in each segment.) During the recording process, information is gathered concerning the location of the samples of each word on the disc.

The read-out mechanism consists of a number of decoders equal to the number of lines which can be serviced at any time. Each decoder is provided with an input from each of the read-out heads (one per track). On each of the inputs to each decoder, there appears a succession of pulses corresponding to all of the samples read out from the respective track.

When the computer used with the voice response system determines that a particular word is to be extended to the line connected to a particular one of the decoders, it conveys three types of information to the decoder. The first type of information identifies the track containing the word of interest. This causes the decoder to operate on only the pulses coming in on the line from the respective track. The second type of information identifies the sample number in the first segment which contains the first sample of the selected word. For example, in the case considered above if the second word recorded in the selected track is to be read out, the thirteenth sample in the first segment is identified. As the succession of pulses from the first segment comes into the decoder, the decoder counts twelve pulses and then operates upon the thirteenth — representing the first sample of the word of interest. The width of the pulse is converted to a signal level by a time-to-amplitude converter whose output is delivered to a sample hold circuit. No operations are performed on the succeeding pulses in the first segment which come in from the selected track.

However, when the pulses from the second segment start coming in, they are counted and the 13th pulse is operated upon. Again, the width of the pulse is converted to a signal level by the time-to-amplitude converter which is delivered to the sample hold circuit. This process continues until eventually the 13th sample in every one of the 167 segments has been operated upon.

The decoder then automatically starts to operate on the 14th sample in each segment (corresponding to sample numbers 168–334 in the word of interest). Simply by counting the number of pulses in each segment, and waiting for the 14th, another series of 167 samples is opeated upon. Thereafter, the 15th sample in each segment is operated upon. The third type of information transmitted from the computer to the decoder identifies the number of samples recorded in each segment for the selected word, that is, how many times the disc must rotate before all samples of the selected word have been operated upon. The output of the sample hold circuit is filtered (smoothed) prior to delivery to the caller.

As soon as the full word has been read out in this manner, the computer is notified that the decoder is ready for the next word, if there is one. The computer transmits the three types of information to the decoder corresponding to the next word in the message. Access to a given word is very rapid since at most one rotation of the disc is necessary before the first sample in the word is received from the appropriate track, and the disc makes one rotation every 33.3 milliseconds. This fast access to any word makes possible the elimination of the annoying pauses which are found in prior art systems.

The recording technique allows for the storage of vast amounts of information on a single disc. Because samples are recorded rather than continuous analog signals, with a 128–track disc it is possible to record in excess of 1,000 words. Furthermore, the outputting to multiple lines is controlled by conventional digital gating circuitry. A computer need simply deliver three types of information to each decoder to generate the read-out of a particular word for a connected caller. The decoder operates on only one track at a time, and on only the appropriate samples in the selected track. This is accomplished simply by counting the number of samples in each segment as the pulses come in from the selected track. The reconstruction of the samples into an analog signal is also relatively simple — the samples arrive with the same time spacings as those at which they were recorded in the first place, and thus all that is required is to convert them to pulses of varying amplitudes with the use of a single time-to-amplitude converter and to then smooth them.

The complexity of the system grows with the number of lines to be serviced simultaneously since one decoder is required for each such line. Similarly, the complexity of each decoder increases with the number of recorded tracks (which corresponds to the vocabulary size) since the greater the number of tracks the greater the number of inputs to each decoder. However, insofar as the number of tracks is concerned, the input stage of each decoder consists of a track select matrix which enables the pulses from the correct track input to be operated upon in accordance with the first type of information transmitted to the decoder from the computer. The increase in the total cost of each decoder (as a result of a larger matrix) as the number of tracks increases is relatively small. As for the cost of each decoder (the cost of all of which necessarily affects the cost of the entire system and increases with the total number of lines to be serviced simultaneously), because the "correct" pulse in each incoming stream to a decoder is easily determined simply by counting the incoming pulses and comparing them to a count delivered by the computer in the first place, the total cost of each decoder is relatively low. The multiplexing technique used in the recording process greatly simplifies the hardware necessary to output large vocabularies to large numbers of lines.

Each track of the recording medium in the Emerson et al application is independent of the others. It is not even necessary for the segments in all the tracks to be contained in the same angular positions around the disc. This is because each track contains not only sample information, but also timing information. The timing information is used to indicate the start of a new pass of the track past the record and read heads and to separate adjacent segments from each other. The timing signals are also in the form of pulses, a pulse of a first width identifying the start of a track and a pulse of another width separating adjacent segments.

Each decoder includes circuitry for measuring the width of a pulses read from a track not only to determine a sample level, but also to derive the timing information from the signals recorded on the track. In the Emerson et al decoder, two timing circuits are required, one for determing the start of a track and the other for identifying successive segments. It would be highly advantageous to eliminate the requirement for such timing circuits. This is due not so much to the cost of the circuits (although this is a factor), as it is to the fact that each timing circuit generally requires an individual adjustment when it is first included in the decoder. The elimination of the timing circuits would reduce the costs involved in manufacturing and maintaining each of the many decoders which may be included in any system.

It is a general object of my invention to provide a voice response system of the Emerson et al type which does not require timing circuits in each decoder for determining the start of a track and the start of each segment in the track.

In accordance with the principles of my invention, one track of the disc is used to record timing signals. After the timing signals are recorded, each signal track is recorded under control of the timing signals read from the timing track. This means that the spatial recordings in all signal tracks are synchronized to the timing track, unlike the Emerson et al system in which each signal track may be completely independent of all others. A single circuit is provided for reading the timing track and for developing a first pulse at the start of the track and a second pulse following each segment. These pulses are extended to all of the decoders along with the outputs of the read amplifiers associated with the signal tracks. The signal tracks include no synchronizing information, but because they are synchronized to the timing track and the timing signals are extended to each of the decoders, the necessary timing information is made available to each decoder. The two types of timing signals are then used by each decoder as they are in the Emerson et al system to control the proper reconstructin of any analog signal. But becuase timing pulses are now extended to each decoder there is no need to provide two timing circuits in each decoder in order to extract timing information from each signal track.

It is a feature of my invention to provide a separate timing track in an Emerson et al type system, to synchronize the signal track recordings to the timing track, and to extend timing pulses derived from the timing track to all of the decoders in parallel so that all of the decoders can operate upon the signal track outputs without requiring the derivation of timing information.

Further objects, features and advantages of our invention will become apparent upon a consideration of the following detailed description in conjunction with the drawing, in which.

Figure 1:
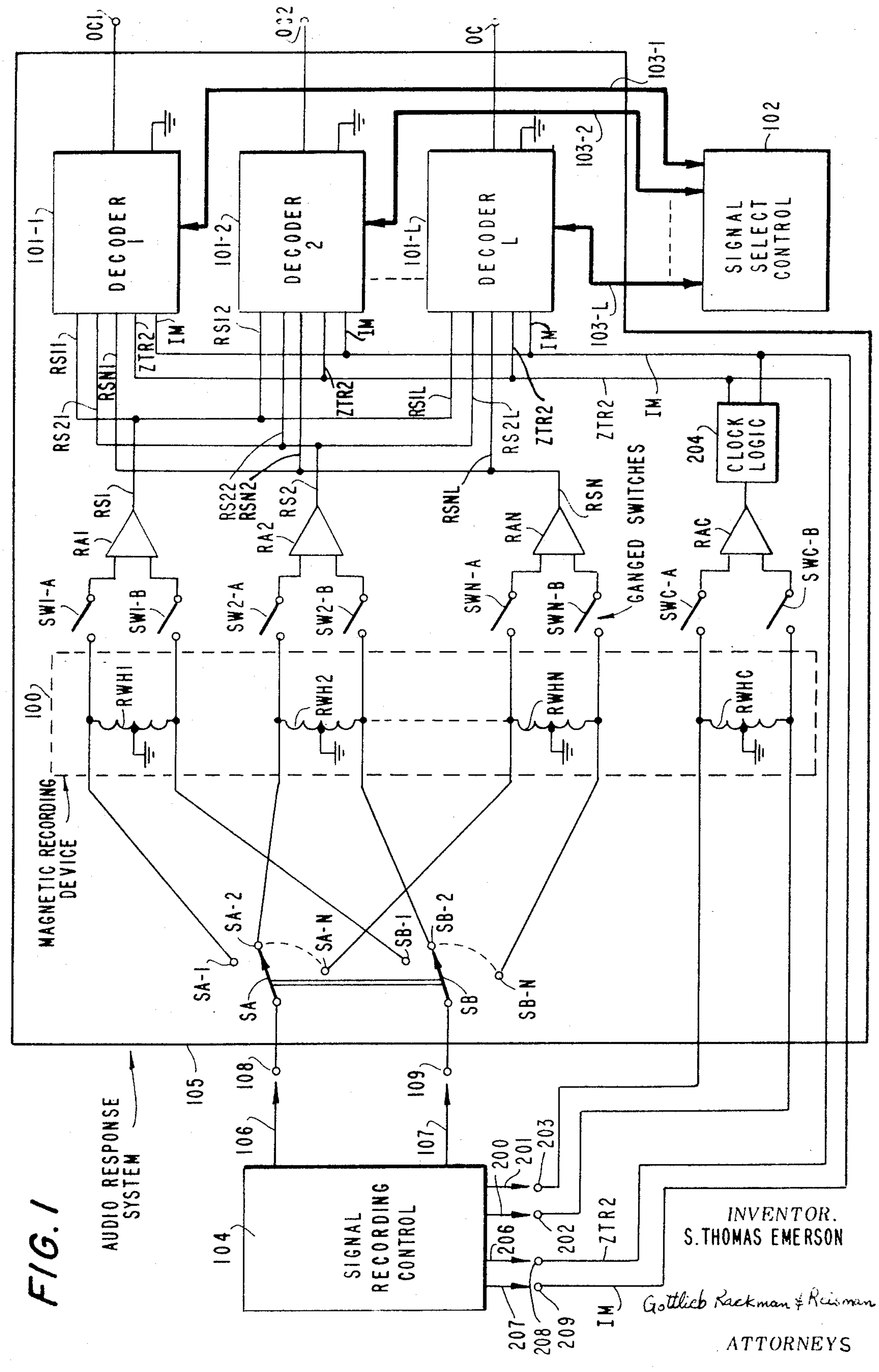
FIG. 1 is a block diagram schematic of the illustrative audio response system of my invention, and further shows a system (104) for controlling the recording of signals and a system (102) for controlling the construction of particular messages for outputting over a number of channels.

The audio response system 105 depicted schematically in FIG. 1 includes a pair of input terminals 108, 109. Signals to be recorded are applied to these terminals by signal recording control unit 104 over conductors 106, 107. Typically, the analog signals (voice, etc.) are recorded in an interlaced sampled format by the manufacturer of the audio response system in accordance with user requirements. In this way, it is not necessary for the user to puschase the recording control unit. If is desired to up-date the recorded signals periodically in the field, this can be accomplished in no more than several hours with the use of a signal recording control unit borrowed or leased for that purpose.

Signal select control unit 102 is typically a digital computer. The control unit is connected to each of decoders 1–L over respective cables 103–1 through 103–L, as will be described below. Each decoder is connected to a respective one of output channels OC-1–OCL. Depending upon the control signals transmitted over the respective one of cables 103–1 through 103–L, a particular analog signal message is delivered to the respective one of the output channels. In a typical application, each user line would be connected to a particular decoder. The control unit determines the desired response depending upon signals received from the user over the line, and would then control the appropriate operation of the connected decoder. As far as the present invention is concerned, what must be understood is that the control unit simply transmits certain coded data words over cables 103–1 through 103–L to the respective decoders in the audio response system. The audio response system then controls the outputting of analog signals on output channels OC-1–OCL. The present invention is concerned with the manner in which the analog signals are recorded in the first place, and the manner in which they are outputted assuming that appropriate commands are generated by a computer or other type of signal select control unit 102.

The audio response system itself includes a magnetic recording device in the illustrative embodiment of the invention. This device is shown in dotted outline by the numeral 100. The device, typically a magnetic disc, includes N + 1 tracks, a respective one of record/read heads RWH1–RWHN being associated with each of the first N tracks. The center tap of the winding of each head is grounded as is known in the art so that a signal of either polarity can be recorded on, or read from, each track. Each record/read head is connectable to both record circuitry and read circuitry. When recording, all of switches SW1–A, SW1–B through SWN–A, SWN–B are opened, all of these switches being ganged together. Each of the record/read heads is connected through a pair of these switches to a respective one of read amplifiers RA1–RAN. These amplifiers are designed for reading purposes only, and as will be described below need respond only to polarity transitions in the magnetic state of a track. Consequently, they may be of relatively cheap design. To record a signal, it is necessary to use a high-quality output stage in the signal recording unit 104. Relatively large currents are delivered to the record/read heads and to prevent damage to the read amplifiers RA1–RAN it is preferable to disconnect them from the heads during the recording process by opening all of the switches in their inputs.

Two selector switches are provided for connecting any one of the N signal track record/read heads to input terminals 108, 109. Head RWH1 is connected at one end to terminal SA–1 in the first selector switch and to terminal SB–1 in the second selector switch. Contacts SA and SB are ganged together, and when they are moved to terminals SA–1, SB–1, a signal can be recorded on track 1 of the disc underneath head RWH1. Similarly, head RWH2 is connected to terminals SA–2 and SB–2. With contacts SA and SB in the positions shown, the output of the recording control unit is recorded on track 2 of the disc. A manual switch is sufficient for recording purposes; all that is required prior to the recording of signals in any track is to connect the respective record/read head to the output of the signal recording control unit.

Track N+1 is the timing track. Record/read head RWHC is grounded in the usual manner. The head is connected to terminals 202 and 203. These terminals, when the timing signals are first recorded, are connected to conductors 200 and 201 of signal recording control unit 104. While the timing signals are being recorded on the timing track, switches SWC-A and SWV-B may be left opened, as shown.

Following the recording of the timing track, these two switches are closed and no further signals appear on conductors 200 and 201 from the signal recording control unit 104. Instead, amplifier RAC amplifies the signals previously recorded in the timing track and clock logic 204 derives at its two outputs two types of pulses designated ZTR2 and IM. The former is an indication that the start of the timing track is passing head RWHC. The latter is an indication that the end of a segment is passing the record/read head. The timing signals are used both in the recording of any signal track and the retrieval of any information from it.

The two timing signals are extended to terminals 208 and 209 which are connectable to conductors 206 and 207 from the signal recording control unit 104. During the recording of the signal tracks, since it is necessary to synchronize the recordings to the timing track, the timing signals ZTR2 and IM are extended back to the signal recording control unit. The timing signals determine when the sample pulses are applied to conductors 106 and 107 to be recorded in a selected track. After all recordings are made, the timing signals are still needed to enable the decoders to properly decode the pulse samples. The two timing signals are extended to each of the decoders, and, as will be described below, are used by the decoders to select the proper pulses from the various signal tracks in the reconstruction of any analog signal.

When the system is in use in a voice response application, all of switches SW1–A, SW1–B through SWn–A, SWN–B, and switches SWC–A and SWC–B, are closed. Read amplifier RA1 continuously amplifies the pulses which are read by record/read head RWH1 from track 1 of the disc. The pulse sequence appears on conductor RS1. This conductor is connected over conductors RS11–RS1L to one input of each of decoders 1–L. Similarly, output conductor RS2, on which continuous pulses from track 2 of the disc appear, is connected over conductors RS21–RS2L to one input of each of the decoders. In general, the first of the two digits in each decoder input conductor designation refers to the track number from which the signal on the conductor is derived, while the second digit in the code refers to the number of the decoder itself.

When the audio response system 105 is in use in its read mode, signal select control unit 102 causes each decoder to operate on only the pulse stream appearing on one of its N input conductors. The pulse stream is operated upon such that an analog (e.g., voice) signal appears on the respective output terminal OC1–OCL. This multiplexing technique allows the same word to be heard over each channel (for example, signal select control unit 102 may cause each decoder to operate upon the same pulses appearing on the respective one of conductors RS21, RS22,...RS2L). Similarly, it is possible for different words to be heard at the same time on each output channel if each decoder operates on the output of a different one of read amplifiers RA1–RAN, or even if the decoders operate on different pulse sequences from the same read amplifier. If signal select control 102 informs a decoder not to operate on any pulse sequence, then no analog signal will appear on the respective output channel. It should be mentioned that the response of the system is so fast — there is almost immediate access to any recorded word — that in many cases the control unit will deliberately introduce a delay between successive words in order to allow a pause between successive words, or successive phrases in a message, as will be described below.

For the purposes of the following description, the analog signals to be considered will be in the audio frequency range since it is contemplated that this will probably, although not necessarily, be the range of frequencies which will be recorded and reproduced in many applications of the invention. The use of audio frequencies in no way detracts from the fact that the audio response system may be used in a similar manner for other waveforms and frequencies, by varying appropriate parameters such as sampling rate, rotational velocity of the recording medium, and the electrical and electronic components used in encoding, recording, and reproducing the waveforms. The recording medium consists of a rotating magnetic storage device, either a magnetic disc or a magnetic drum, which may be of the conventional types presently manufactured. For the audio response system to have multiplexed output capabilities in order to service several output channels simultaneously, it is desirable for the recording medium to have one read head per track or channel or recorded information.

The system functions by storing in its memory (on its recording medium) sufficient information to reproduce the amplitude envelopes of "vocabulary" signals to a specified degree of accuracy. This is accomplished by taking a sequence of samples of the amplitude envelope of each signal to be stored, encoding the samples in a suitable form, and storing them on the rotating magnetic storage device. In generating outputs, the information is retrieved from the rotating magnetic storage device; it is then decoded and the sequence of instantaneous amplitude values of the signal is reconstructed. Finally, the amplitude samples are smoothed to produce a continuous electrical signal which is outputted.

The number of samples which must be stored in order to reproduce a given signal depends upon the duration of the signal and the sampling frequency. This sampling frequency is determined by the fidelity requirements for reproduction. In general, for good reproduction of a signal, the sampling rate should be several times the highest frequency component of the signal. As will become apparent below, the sampling frequency which is employed by the system during the recording and playback processes may not necessarily be fixed. It may vary slightly, but the variations need not introduce any distortion in the output signal provided that the time interval between any two successive samples during the recording process is indentical to the corresponding interval between the two samples retrieved during reproduction, a condition which is strictly adhered to in the system.

By employing the sampling technique described generally above, the system is able directly to record on, and play back from, a disc or drum electrical signals whose time durations are much greater than the rotation time of the disc or drum. (Hereinafter, a disc will be considered for illustrative purposes.) This is accomplished without input or output buffering by employing a special format for storing information on the disc. This format shall hereafter be designated as "sample sequence interlacing". It wall be helpful to make certain preliminary comments before describing the sample sequence interlace technique in detail. The numerical values used in these comments are purely illustrative, and are in no way essential to the principles of operation of the system:

1. When employing the system to store and reproduce signals in the audible frequency range, sampling frequencies may range roughly from a minimum of about 1 kHz to a maximum of about 30 kHz.
2. A typical rotational velocity for a conventional commercially available disc (or drum) is 1800 revolutions per minute, or one rotation every 33⅓
3. Also typical for a conventional magnetic disc (or drum) is a data storage read-write rate of approximately one megabit per per second per track.

From the above comments the following statements apply, assuming that the signal to be directly recorded on the disc is a typical spoken work:

1. Since the signal may have a duration from several hundred to several thousand milliseconds, it may be recorded over many rotational cycles of the disc.
2. The time interval between successive samples of any one signal will be of the order of 200 microseconds (a sampling rate of 5 kHz), which is equivalent to approximately 200 bits on the disc surface. Since the information per sample occupies only a few bits out of the 200 or so between successive samples, it follows that the information pattern corresponding to a succession of samples fills the available information space on the disc only sparsely at widely separated intervals. Therefore, it is possible to record on the rotating magnetic storage device a sampled electrical signal, whose duration is many times the rotational period of the disc, by interlacing the information streams produced during subsequent rotations of the disc with the information recorded during previous rotations. This can be accomplished by writing the later information in the gaps remaining after the previous information has been recorded.

Figure 2:
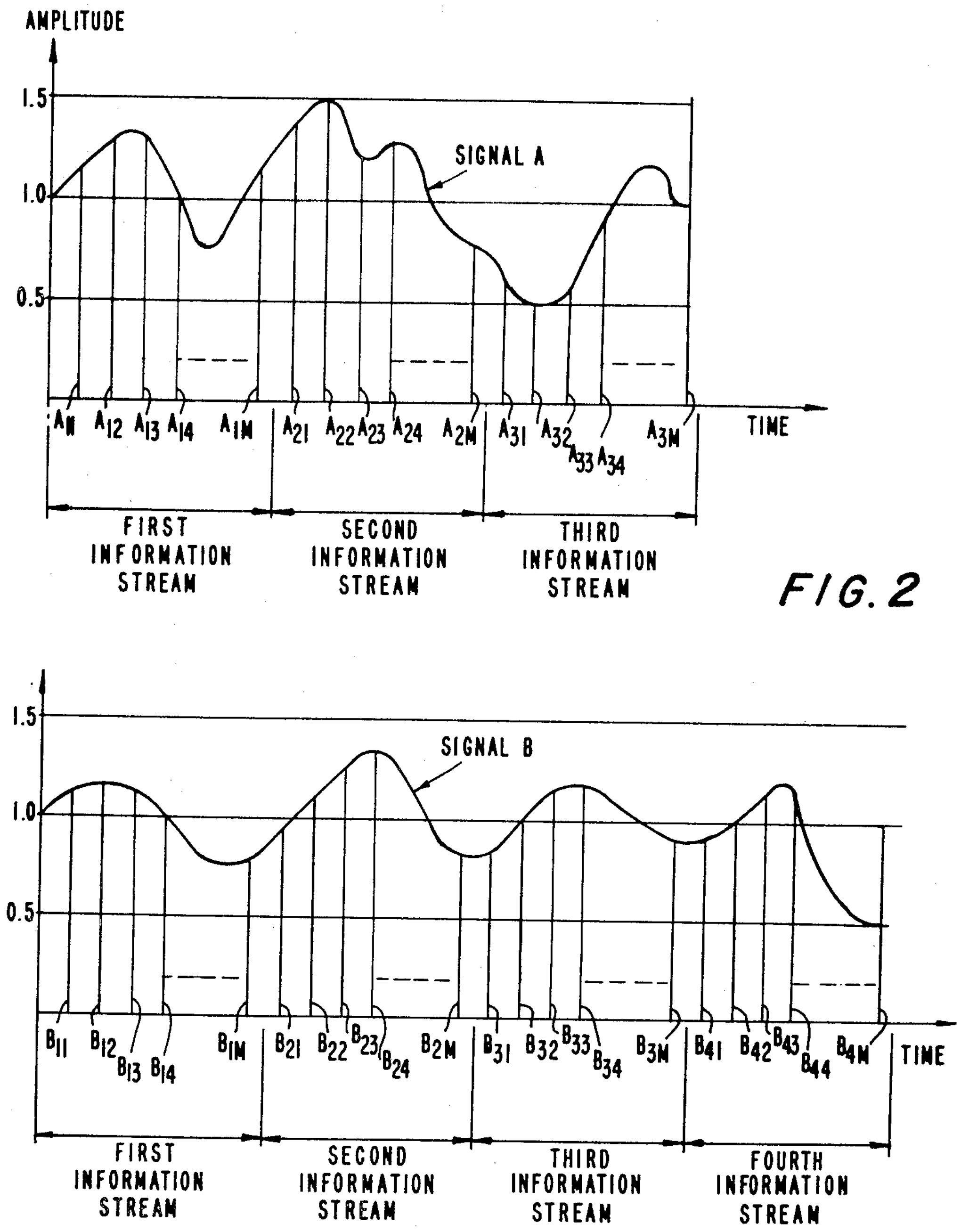
FIG. 2 depicts the manner in which two signals (A and B) are sampled prior to recording in accordance with the principles disclosed in the Emerson et al application.
Figure 3:
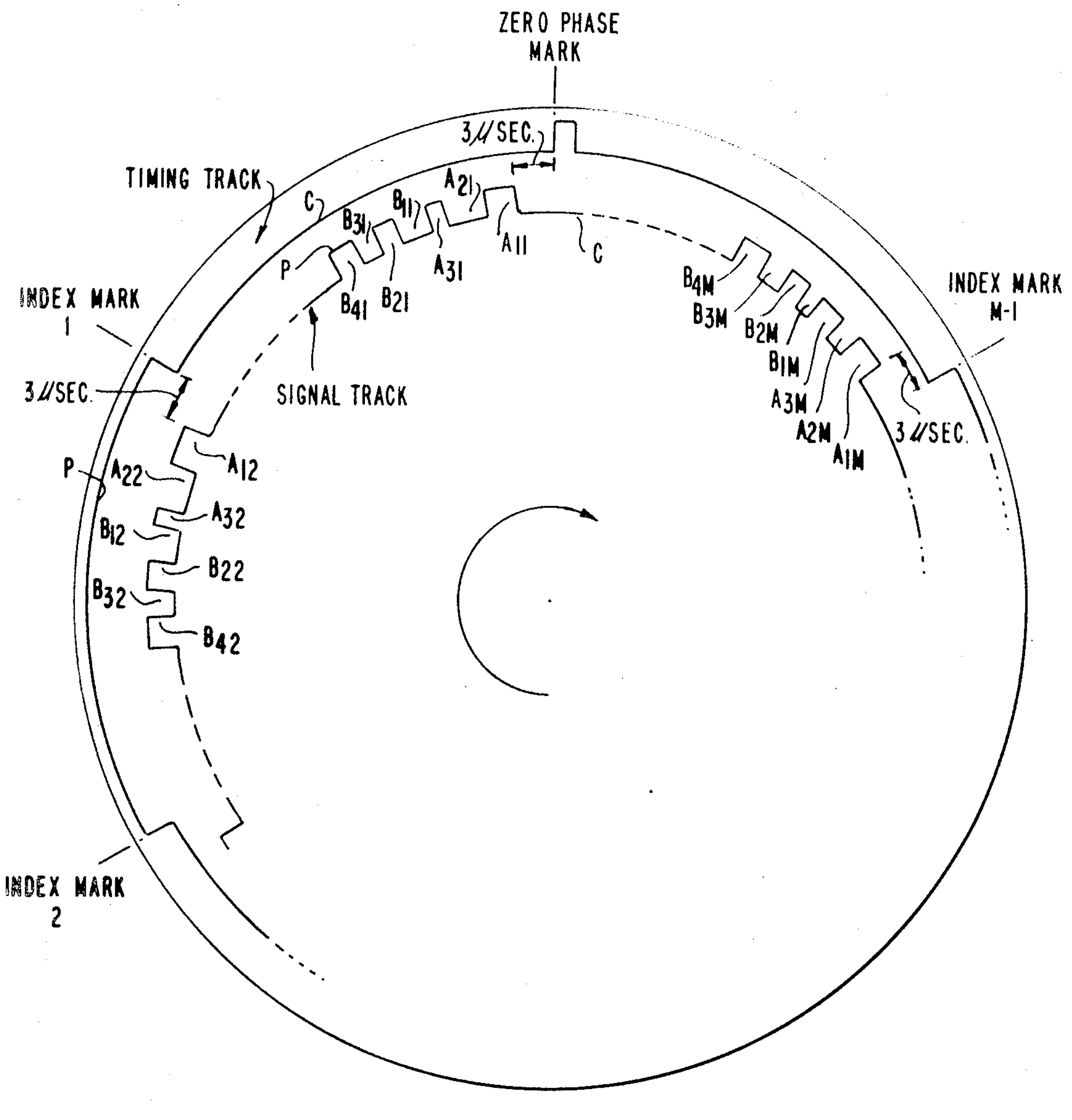
FIG. 3 depicts schematically the format in which the samples of FIG. 2 are recorded on a track of a magnetic disc (or drum), along with the signals in a separate timing track.

The sample sequence interlacing process produces the data storage format shown schematically in FIG. 3. Every track consists of alternating magnetic states, designated C and P. The drawing is not to scale (wih 167 segments per track in the illustrative embodiment of the invention, the angle between successive Index Marks is only slightly in excess of 2°, as opposed to the over 40° ), but shows the format of the single timing track and one of many signal tracks on the disc with the subscripted symbols associated with the signal track showing the locations of the information corresponding to various encoded amplitude samples of the signals of FIG. 2. The lines designatd as Index Marks and the Zero Phase Mark on FIG. 3 consist of special recorded information which is distinguishable by the circuitry that processes the informaion read off the disc so that it can select the appropriate sequence of samples to be recorded or outputted. In general, with M segments there are (M–1) Index Marks.

The first sample $A_{11}$ of signal A is stored in the signal track 3 microseconds after the Zero Phase Mark in the timing track. Subsequent samples ($A_{12}$ through $A_{1M}$) recorded during the first revolution of the disc occur 3 microseconds after successive Index Marks. The samples taken during the second revolution of the disc ($A_{21}$ through $A_{2M}$) are stored adjacent to the samples taken during the first revolution, etc. By way of nomenclature, the sequence of samples recorded during a given revolution of the disc commencing with and ending with the Zero Phase Mark is designated as an "information stream". The signal is thus recorded by interlacing a sequence of information streams. Three separate information streams are required to store signal A. The first stream, consisting of elements $A_{11}$ through $A_{1M}$, represents the first M samples of the amplitude waveform A. Similarly, the second and third information streams comprising the remainder of signal A consist of elements $A_{21}$ through $A_{2M}$, and $A_{31}$ through $A_{3M}$, respectively.

The four information streams required for signal B of FIG. 2 are also partially shown in FIG. 3 to illustrate further the interlacing technique. Additional signals are stored after signal B until the storage capacity of the track is exhausted.

A given information stream (say the Jth) may be selected from the flow of output information from the disc simply be selecting the Jth sample after the Zero Phase Mark and after each Index Mark. The sequence of samples representing an entire signal is obtained by selecting and outputting the successive information streams corresponding to that signal. To output signal B, for example, information streams 4–7 are outputted in succession.

It is apparent that it is not necessary for the duration of any recorded signal to be an integral number of information streams. The first sample of the next signal may be recorded in the middle of an information stream — after that Index Mark which follows the last sample of the previous signal. It is possible to start outputting with a sample in the middle of an information stream (e.g., with the first sample of a word) by counting the number of Index Marks which occur after the Zero Phase Mark, and using this information to select the first sample. Even though each signal in the illustrative embodiment of the invention starts with the new information stream, it may be desirable to start outputting in the middle of an information stream. For example, the word "account" may start at the beginning of some information stream, but to produce the word "count" from the same signal outputting might begin in the middle of some subsequent information stream in the same series.

The number of segments in each signal track equals the number of Index Marks (including the Zero Phase Mark) which occur in the timing track during one rotation of the disc. The sampling period is determined by the ratio of the rotational period of the disc to the number of segments. In the illustrative example, this ratio is 33,333⅓ microseconds divided by 167 segments, or a little over 199 microseconds. It shall be assumed below that the basic sampling period is 200 microseconds.

It should be noted that to generate the sample sequence interlace format described above, it is necessary that the information for each sample be written at precisely the right time if it is to be placed in its proper location on the rotating magnetic disc. This is accomplished by utilizing a signal derived from the information already recorded on the disc to initiate the sampling process. Thus sampling and storage are synchronized to the magnetic storage device itself, permitting the direct recording of the signal in the sample sequence interlace format.

Storage of information in the sample sequence interlace format may be accomplished using a variety of encoding techniques. With the use of a digital encoding technique, for example, each amplitude sample is encoded in the form of a digital number (e.g., a binary number). This number is then stored on the magnetic disc in the appropriate location determined by the sample sequence interlace format using conventional digital recording techniques. The "appropriate location" can be successive bits on the same track or of a single bit in each of several parallel tracks. A preferred encoding technique, however, is that of temporal modulation because it has the advantage of permitting very high information storage density.

In the temporal modulation storage scheme disclosed in the Emerson et al application and utilized herein, a pair of pulses are generated such that the time interval between the pulses is proportional to the amplitude of the sample to be recorded. The average value and the range of this inteerval can be made quite small (in the order of one microsecond), being limited primarily by the effect of the intrinsic read-write jitter characteristic (inherent timing uncertainty) of the magnetic disc device. This interval between pulses is used to determine the interval between corresponding transitions in the magnetic state of the surface of the magnetic disc.

The recording or writing process in the illustrative embodiment of the invention can be understood with reference to FIGS. 2, 3, 8 and 9. Sample sequence interlace and termporal modulation encoding are utilized to generate the storage format. The information stored on each signal track of the rotating disc is recorded independently using the record/read head and read-write circuits associated with that track to be described below, in conjunction with timing signals derived from the timing track (which is the first track to be recorded). The writing process is in distinct steps:

Step 1:

The timing track to be recorded is set to a constant magnetic state. Hereinafter this state is referred to as the C or Clear state. (The opposite polarity state is hereinafter referred to as the P or Preset state.) This is accomplished by applying the appropriate write current to one phase of the record/read head for a period of time which exceeds the rotational period of the rotating disc. The magnetic state of the track following Step 1 is shown schematically in FIG. 8(*a*). (In FIGS. 8 and 9, one complete revolution of the disc is represented by a straight line with the angular measure from 0° to 360° being translated into the linear dimension.)

Figure 8:
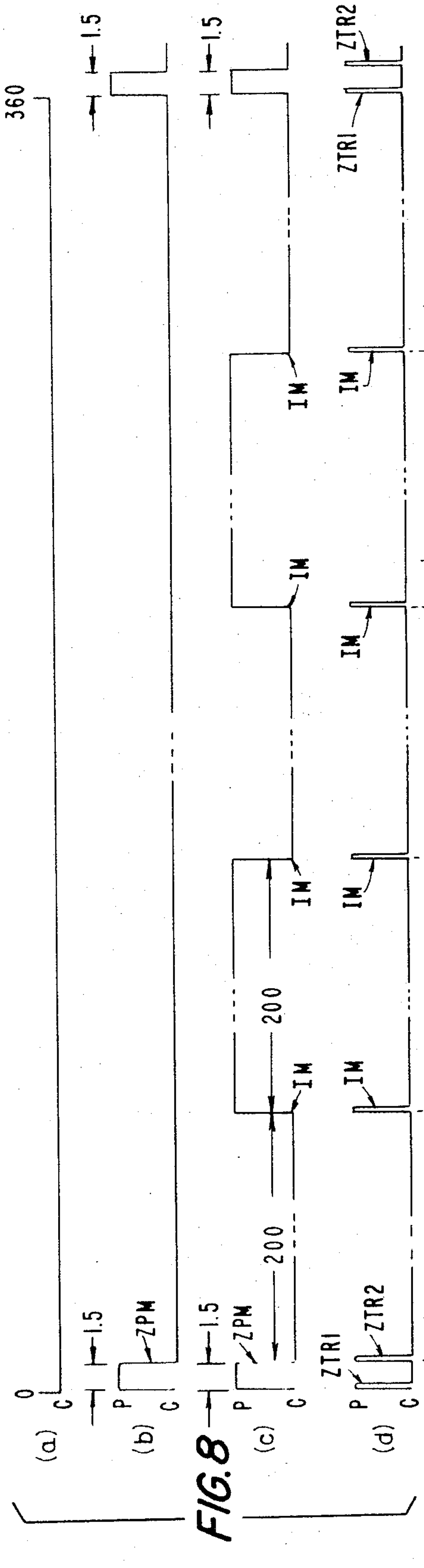
FIG. 8 depicts schematically the recording in the timing track and certain pulses derived therefrom.
Figure 9:
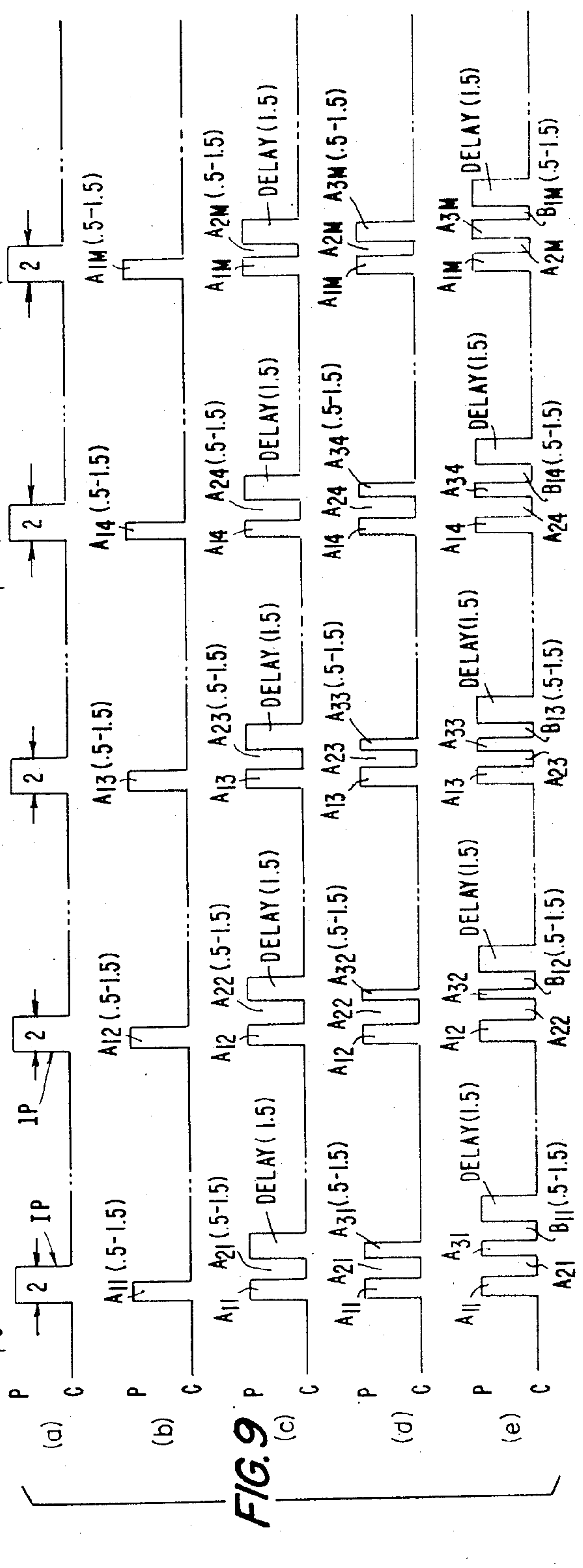
FIG. 9 depicts schematically the state of one signal track at various stages of the recording process as the samples of FIG. 2 are recorded.

Step 2:

The Zero Phase Mark (ZPM) is written. This consists of writing a short region of P state on the cleared track, as shown schematically in FIG. 8(*b*). With a disc rotating at 1800 RPM, the ZPM is made to have a duration of 1.5 microseconds. (All pulse width dimensions on FIGS. 8 and 9 are in microseconds.)

Step 3:

Using the ZPM for synchronization, Index Marks are now written on the timing track. These Index Marks consist of a special pattern in the magnetic state of the track as shown in FIG. 8(*c*). The Index Mark pattern consists of alternating regions of P and C states. The length of each of these regions is such that one transition of the magnetic state of the track passes the timing track record/read head RWHC in a equal to one period (200 microseconds) of the sampling frequency. The region immediately following the ZPM is in the C state and the region immediately preceding the ZPM is also in the C state. (The reason for using only an even number of Index Marks — giving rise to an odd number of segments — is to isolate the ZPM in this manner.) The Index Marks serve to regulate the sampling of the audio waveform during the recording process; they perform a similar indexing function during the playback.

Step 4:

An "initial" pulse waveform (IP) as shown in FIG. 9(*a*) is recorded in any signal track to be operated upon. Each pulse is 2 microseconds in duration and follows the trailing edge of the SPM or an Index Marx after a delay of 3 microseconds.

Step 5:

Successive samples of the input amplitude signal A (FIG. 2) are stored in the sample sequence interlace format using temporal modulation encoding, followed by samples of signal B, etc.

Sample $A_{11}$ (after being converted to a pulse width in the range 1.5–1.5 microseconds) is stored by making a P-to-C transition in the magnetic state of the recording surface within the first IP pulse with a spatial separation from the start of the pulse proportional to the amplitude of the signal sample. Similarly, sample $A_{12}$ is stored by writing a P-to-C transition in the magnetic state of the recording surface within the second IP pulse with a spatial separation from the start of the pulse proportional to the amplitude of the signal sample. In a similar manner samples $A_{13}$ through $A_{1M}$ are stored by writing transitions within IP pulses 2 through (M−1). Samples $A_{11}$ through $A_{1M}$ stored in this manner comprise the first information stream.

The reason for writing IP pulses (of P polarity) in the first place is that when the first sample in each segment is recorded, the state of a flip-flop which controls the polarity of the recording switches from the C state to the P state at the leading edge of each pulse. Since there is some finite delay in the switching of the flip-flop, it is desirable to have the initial portion of each of samples $A_{11}$–$A_{1M}$ recorded even before the sample is taken. Thus the initial portion of each sample pulse is recorded without reference to the acutal signal level. It is the trailing edge of each pulse (which occurs 0.5-1.5 microseconds after the leading edge) which determines the duration of the sample. After all of the samples in the first information stream have been recorded, the signal track has a recording of the form shown in FIG. 9(*b*).

The second information stream, comprising samples $A_{21}$ through $A_{2M}$, is stored by writing transitions following the respective stored samples $A_{11}$ through $A_{1M}$. The width of each pulse in the second information stream corresponds to the amplitude of the respective sample. The width of each pulse is once again somewhere between 0.5 and 1.5 microseconds as indicated in the waveforms of FIG. 9. (The actual width shown for each pulse corresponds to the actual amplitude of the respective sample in FIG. 2. Similarly, the width of each sample in FIG. 3 corresponds to the amplitude of the respective sample in FIG. 2).

The state of the track following the recording of the samples in the second information stream is shown in FIG. 9(*c*). Following the recording of each sample, a recording of the opposite polarity is made. This recording of opposite polarity is referred to as a "delay". While the width of each sample is in the range 0.5–1.5 microseconds, the width of each dealy pulse is 1.5 microseconds. The reason for the delay pulse is as follows. When the circuit first detects the trailing edge of the first sample pulse is any segment, it causes the head to start placing the track in the C state. (Actually, there is no change in the state of the track since it is initially in the C state.) At the end of the recording of the second sample, in order to indicate the end of the sample it is necessary for the state of the track to switch to the P state. Theoretically, it would be possible to record just a very narrow P pulse to indicate the transition, and then to allow the track to remain in the initial C state. During the next pass of the track, the transition would be detected and the next pulse (on the P level) would be recorded. However, it requires some finite time interval before the write circuit turns on. Were only a short P spike recorded after sample $A_{21}$, what would be recorded by the end of the third pass (FIG. 9(*d*)) would be P pulse $A_{11}$, followed by C pulse $A_{21}$, followed by a short P spike, followed by a C region (which passed the record/read head while the write circuit turned on), finally followed by the trailing portion of P pulse sample $A_{31}$. To make sure that the third pulse recorded in segment 1 (pulse $A_{31}$) starts with the transition at the end of pulse $A_{21}$, the track is initially placed in the P state and left there for 1.5 microseconds immediately after sample $A_{21}$ recorded. The P state is recorded in anticipation of the next sample. Similarly, after P sample $A_{22}$is recorded in segment 2, the track is placed in the P state for 1.5 microseconds before it is returned to the normal (C) state for the segment. This is to insure that the next sample recorded after sample $A_{22}$, sample $A_{32}$(see FIG. 9(d)), starts immediately after sample $A_{22}$. although the delay pulses are recorded, they are not permanent "information". The initial portion of each delay pulse is of the correct polarity for the next sample to be recorded. The trailing portion of each delay pulse is erased during the recording of the next sample in the segment, which occurs during the next pass of the disc. The recording of the delay pulses is comparable to the recording of the IP pulses before the recording of the samples in the first information stream.

It should be noted that the following each pulse in the first (third, etc.) information stream (FIG. 9(*e*)), there is no "delay" pulse. But there is no reason for such an identifiable pulse when an odd number information stream is recorded. The reason for the pulse in FIG. 9(*b*) is to place the track in the (P) state in which the next pulse will be recorded. Following the recording of a P pulse in any segment, during the recording of an even information stream, if it is less than 1.5 microseconds in width it is necessary to return the track to the C state, i.e., to erase the trailing edge of the previously recorded P delay pulse. In fact, a 1.5-microsecond C pulse is recorded. But it cannot be observed because at the end of the delay pulse, when the write circuit turns off, the rest of the segment is still in the C state as a result of the first step in the recording sequence (FIG. 9(*a*)).

As shown in FIG. 9, each sample has a pulse width between 0.5 and 1.5 microseconds. Referring to FIG. 2, the input signal to be recorded is amplifed and DC-biased so that it ranges between 0.5 and 1.5 units. A non-zero minimum signal level is required so that the amplitude-to-time conversion process will produce a minimum pulse width of 0.5 microseconds; every sample must result in the recording of a pulse having at least a minimum width to maintain accurate system timing and proper sample sequencing. In the case of an audio signal as shown in FIG. 2, the AC zero base line is translated to the one-unit level and the signal amplitude is adjusted to vary between 0.5 and 1.5 units. The write circuit includes an amplitude-to-width converter which produces a pulse width of approximately 0.5 microseconds for the minimum signal level and a pulse width of 1.5 microseconds for the maximum signal level. In the decoding process, the width-to-amplitude conversion reproduces the signal with a similar base line offset. The true AC base line of the original signal is restored by passing the output signal through a capacitor.

Of course, the levels of 0.5 and 1.5 in FIG. 2 serve only as a reference to the pulse widths on FIG. 9. The actual input signal may be in millivolts, volts, etc., as long as the amplitude-to-width converter in the write circuit produces a 0.5-microsecond pulse for the minimum signal level and a 1.5-microsecond pulse for the maximum signal level.

Immediately following the recording of the third and last information stream of signal A (FIG. 9(*d*)), the first B information stream (samples $B_{11}$ through $B_{1M}$) are recorded as shown in FIG. 9(*e*). Delay pulses are visible since at the end of the recording of each sample pulse the track is placed in the P state for 1.5 microseconds. Immediately following the recording of the first information stream of signal B, the second through fourth information streams shown in FIG. 2 are recorded, although they are not shown in FIG. 9.

It is thus apparent that not only are the samples in any particular signal interlaced on a track, but the samples of different signals are interlaced as well.

Figures 4, 5A:
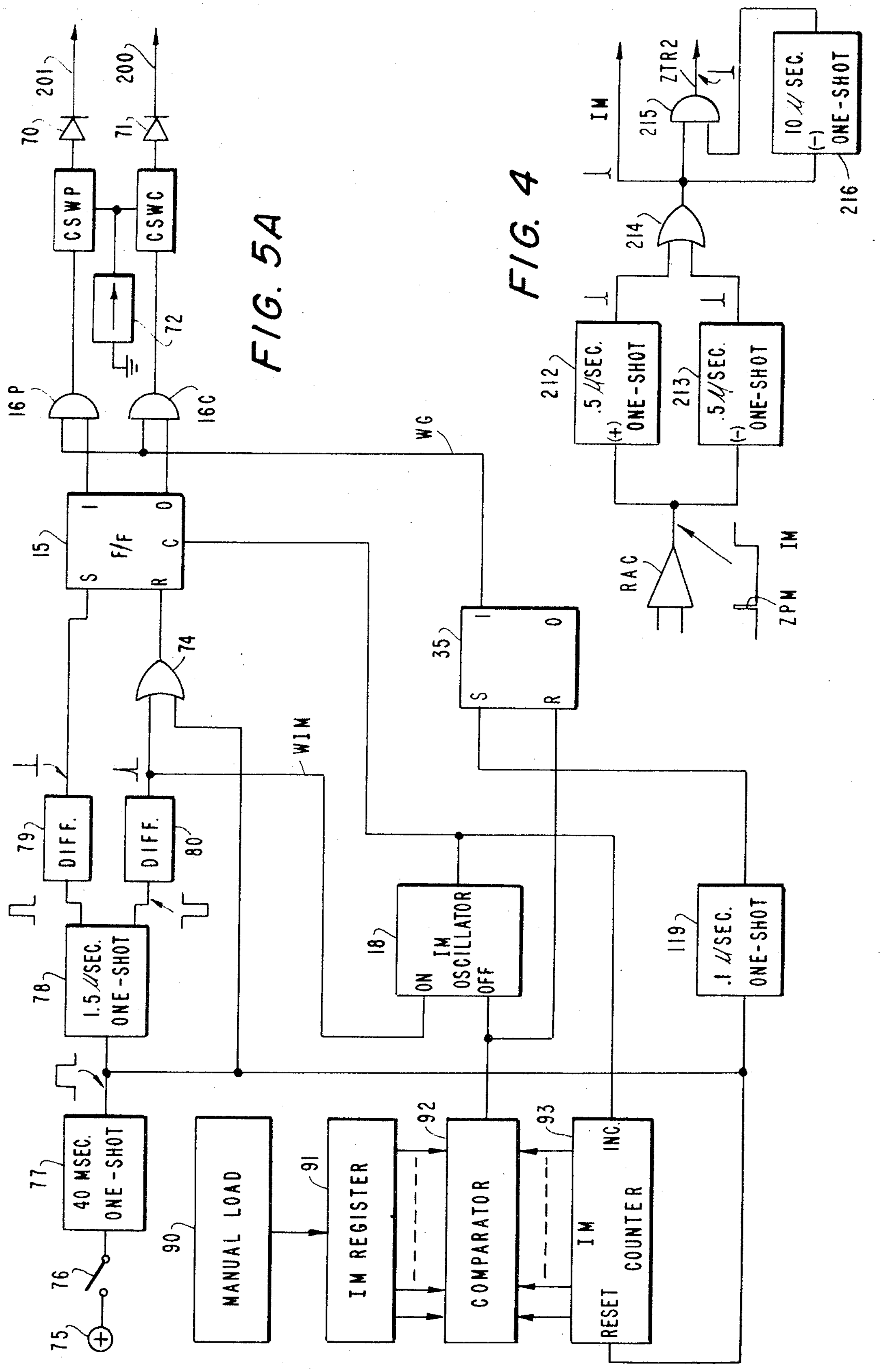
FIG. 4 is a schematic circuit of "clock logic" 204 of FIG. 1.
FIGS. 5A, 5B and 5C depict schematically the signal recording control 104 of FIG. 1, with FIG. 5B being placed on top of FIG. 5C.

FIG. 4 shows the "clock logic" 204, shown as a block in FIG. 1. The input to amplifier RAC is derived from the timing track record/read head RWHC. A waveform corresponding to that shown in FIG. 8(*c*) is applied to the input of each of one-shot multivibrators 212 and 213. Multivibrator 212 is triggered by a positive step and multivibrator 213 is triggered by a negative step. The output of each multivibrator is a short (0.5-microsecond) spike, and the outputs of the two multivibrators are extended to inputs of OR gate 214.

The output of the OR gate is as shown in FIG. 8(*d*). Every transition in the timing track results is one of the two multivibrators extending a pulse to the OR gate. Consequently, a positive spike appears on the IM conductor at both the leading and trailing edges of the ZPM pulse in the timing track, and whenever an IM transition in the timing track passes record/read head RWHC.

The trailing edge of each positive spike at the output of OR gate 214 triggers one-shot multivibrator 216. Each time this multivibrator is triggered, a ten-microsecond pulse appears at its output to energize one input of AND gate 215. Whenever a pulse is extended through OR gate 214 as a result of an IM transition in the timing track passing head RWHC, one input of gate 215 is enabled but by the time the next transition occurs 200 microseconds later the output of multivibrator 216 has gone low. consequently, the next pulse at the output of OR gate 214 is not extending through gate 215. However, when the spike at the output OR gate 214 corresponding to the leading edge of the ZPM pulse (ZTR1 in FIG. 8(*d*)) occurs, multivibrator 216 is triggered in the usual manner. This time, the next pulse at the output of OR gate 214 — corresponding to the trailing edge of the ZPM as shown by the pulse ZTR2 in FIG. 8(*d*) — is extended to gate 215 while the output of multivibrator 216 is still high. Consequently, the ZTR2 spike is extended through gate 215. It is apparent that every transition in the timing track results in a pulse on the IM conductor, while a pulse appears on the ZTR2 conductor only when the trailing edge of the ZPM passes record/read head RWHC. The IM and ZTR2 pulses are extended both to signal recording control unit 104 (to control the recording of samples in any signal track) and to all of the decoders 101–1 through 101–L (to control the proper reconstruction of analog signals from the samples read from any signal track).

Figure 5B:
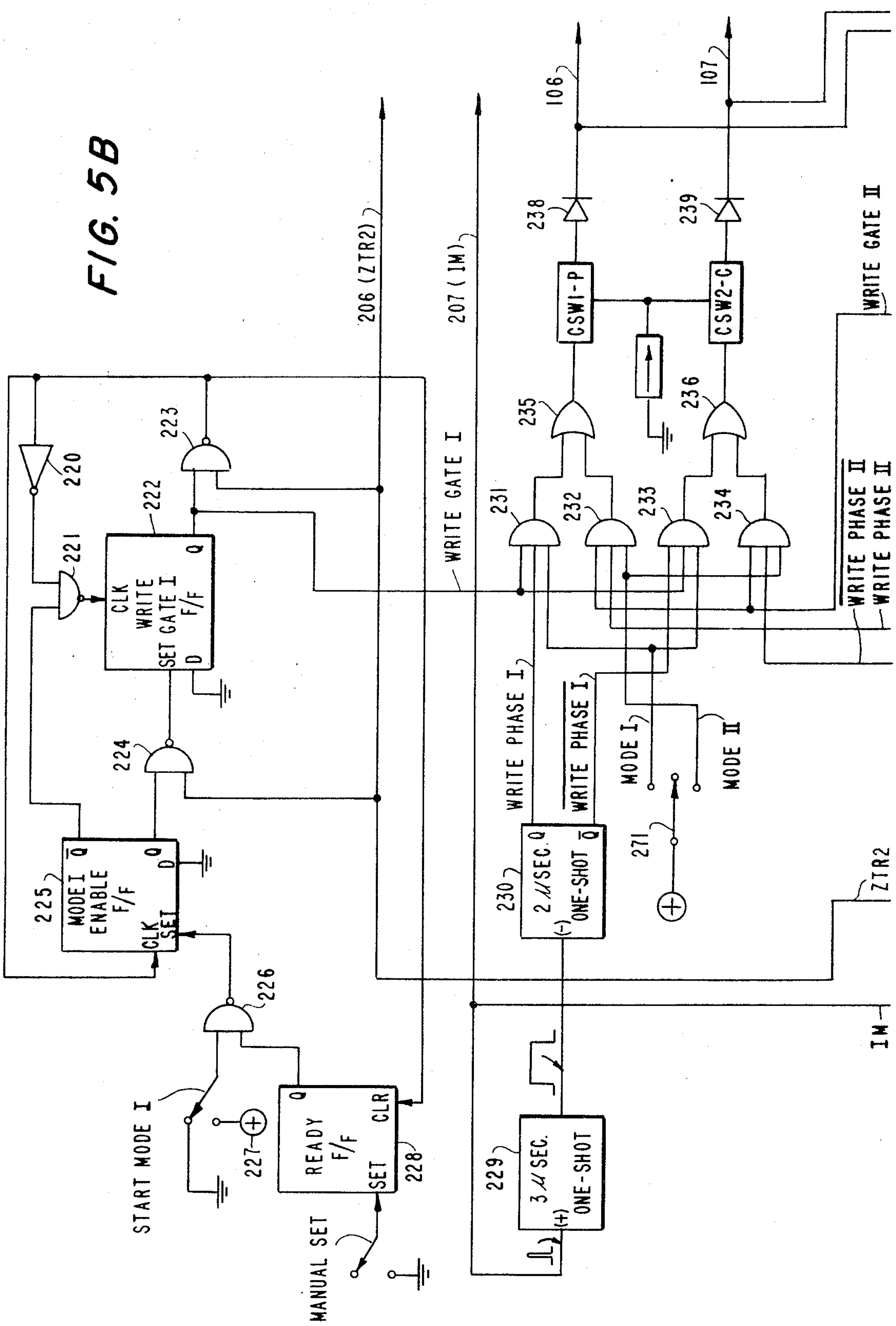
Figure 5C:
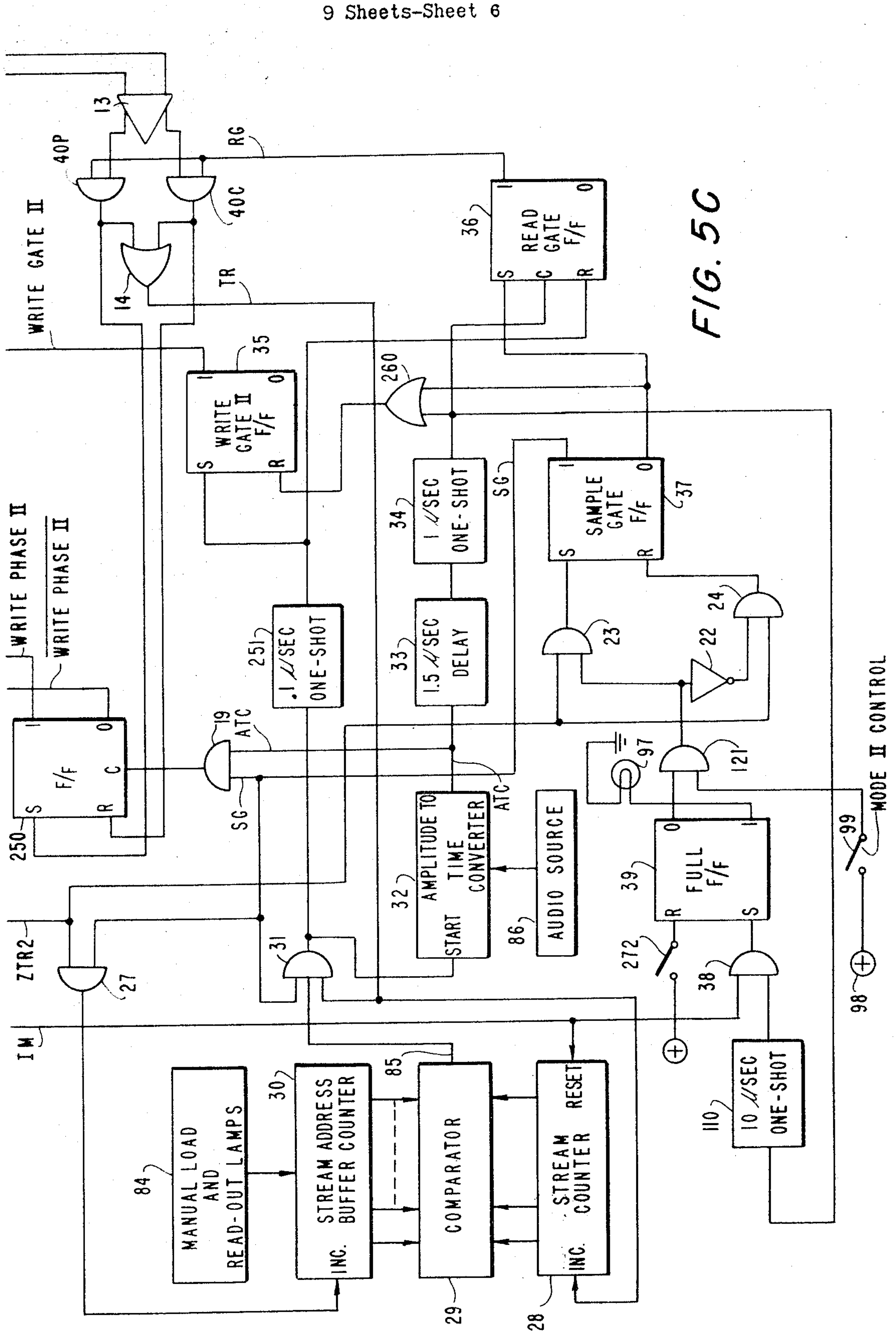

Signal recording control 104 (FIG. 1) is shown in detail in FIGS. 5A, 5B and 5C. The circuit of FIG. 5A is used to control the recording of the timing track. Conductors 200, 201 are connected to the two ends of read/record head RWHC in the audio response system. The center tap of read/record head RWHC is grounded. To record the P state, gate 16P is enabled and current switch CSWP in FIG. 5A turns on. Current flows from current source 72, through the current switch, diode 70, conductor 201 and the upper half of the winding of the record/read head RWHC. On the other hand, to record the C state, gae 16C is operated to turn on current switch CSWC. Current from source 72 now flows through this switch, diode 71, conductor 200 and the lower half of the winding of record/read head RWHC. Which of gates 16P, 16C operates depends on the state of flip-flop 15. If the flip-flop is in the 1 state, gate 16P is enabled and if it is in the 0 state gate 16C is enabled. The other input to each gate is connected to conductor WG. Only when this conductor is energized does any recording take place. The function of diodes 70, 71 is to isolate the two current switches from record/read head RWHC when the state of the timing track is being read.

During step 1, the entire timing track is placed in the C state. This is accomplished by momentarily operating manual switch 76. Potential source 75 is connected to the input of one-shot multivibrator 77. this multivibrator generates a 40-millisecond pulse at its output. The pulse is extended to the rest input of IM counter 93 whose count is reset to zero. The pulse is also extended to the input of 0.1-microsecond one-shot multivibrator 119. The trailing edge of the multivibrator pulse, applied to the set input of write gate flip-flop 35, places the flip-flop in the 1 state to energize conductor WG. With conductor WG energized, recording takes place.

The 40-millisecond pulse from multivibrator 77 is also extended through OR gate 74 to the reset input of flip-flop 15. The flip-flop is placed in the O state to enable gate 16C rather than gate 16P. Since conductor WG is also energized, gate 16C operates to turn on current switch CSWC. At this time recording in the C state begins in the timing track. Since no changes take place until after the 40-millisecond pulse at the output of multivibrator 77 terminates, recording in the C state persists for 40 milliseconds. Since the disc makes a single rotation in 33.3 milliseconds, the entire track is placed in the C state.

At the termination of the 40-millisecond pulse, one-shot multivibrator 78 is triggered to begin step 2. The multivibrator has a period of 1.5 microseconds. The output of the multivibrator connected to the input of differentiator 79 is normally low in potential. The differentiator responds only to positive voltage steps. Its input conductor goes high at the start of the multivibrator pulse and is differentiated. A short spike appears at the output of the differentiator and is extended to the set input of flip-flop 15. The flip-flop is thus placed in the 1 state and gate 16P is enabled rather that gate 16C. Since conductor WG is still energized, recording in the P state begins.

Differentiator 80 is connected to the output of multivibrator 78 which is normally high in potential. This conductor is low during the 1.5-microsecond pulse. Differentiator 80, as differentiator 79, responds only to positive steps. Consequently, at the end of the 1.5-microsecond pulse, a short spike appears at the output of differentiator 80. This pulse is extended through OR gate 74 to the reset input of flip-flop 15. The state of the flip-flop is switched and gate 16C is enabled rather than gate 16P. Recording in the C state now resumes. It is thus apparent that the triggering of multivibrator 78 results in the recording of a 1.5-microsecond P pulse on the timing track. This is the ZPM pulse.

It should be noted that no control is exerted over the location of the ZPM pulse on the timing track. It does not matter where the ZPM pulse is recorded; it is the ZPM pulse which from now on controls the proper placement of all IM pulses on the timing track and all sample pulses on the signal tracks. The location of the ZPM pulse in the timing track depends on the angular position of the disc when switch 76 is first operated.

The IM oscillator 18 is initially off. It is turned on only when a positive spike is applied to its "on" input. The oscillator is initially set to the desired sampling frequency. The illustrative embodiment of the invention has been described thus far as having a disc which rotates in 33.3 milliseconds and as having 167 segments. In such a case, each segment passes the record/read head in slightly in excess of 200 microseconds (the oscillator frequency is slightly in excess of 5 kHz). Thus although Index Marks have been described as being separated by 200 microseconds (on a time scale), the time separation is actually slightly less. Alternatively, the speed of the disc can be decreased slightly so that 200 microseconds separate each pair of successive Index Marks with exactly 167 segments appearing on the disc.

The period of oscillator 18 should be adjusted carefully so that the last Index Mark recorded on the timing track (before the ZPM) defines a segment which is no shorter than the other segments. As will become apparent below, recording of all samples terminates when any one of the segments is filled with sample pulses. For this reason, if the last segment is too short, that is, the last IM mark is too close to the ZPM, there will be a needless waste of track capacity. It is better to provide a margin of safety in the opposite direction — the last segment, if it is not equal to the other segments, should be slightly longer than the others.

The pulse at the output of differentiator 80, which controls the termination of the recording of the ZPM, is extended along conductor WIM (Write Index Mark) to the "on" input of oscillator 18 to start step 3. The oscillator turns on and transmits pulses to the clock (C) input of flip-flop 15 at the sampling rate. Each pulse causes the state of the flip-flop to switch. Initially, the state of the track is as shown in FIG. 8(*b*) and flip-flop 15 is in the 0 state, having been placed there by the pulse from the output of differentiator 80. Oscillator 18 is designed to delay its outputting of the first pulse until after the selected period of operation (200 microseconds). The first pulse causes the flip-flop to switch to the 1 state which in turn de-energizes gate 16C and energizes gate 16P. Current switch CSWP opeates rather than current switch CSWC, and as shon in FIG. 8(c) the first IM pulse is recorded. Flip-flop 15 remains in the 1 state for 200 microseconds until the next pulse is transmitted from oscillator 18 to the clock input of the flip-flop. At this time the flip-flop switches state once again and the second IM pulse (C state) is recorded as shown in FIG. 8(c). This process continues until the 166th pulse its outputted from oscillator 18. At this time flip-flop 15 switches to the 0 state and the last IM pulse (C state) is recorded.

It is necessary to reset the write gate flip-flop 35 so that IM pulses are not recorded over the ZPM pulse. This is controlled by IM register 91, comparator 92 and IM counter 93. At the start of the recording process, manual load unit 90 is set to the desired number of Index Marks, in this case 166 (to provide 167 segments). A count of 166 in thus loaded in IM register 91. IM counter 93 is initially reset to a count of zero with the operation of one-shot multivibrator 77. Each IM pulse from oscillator 18 is extended to the increment input of the counter. Comparator 92 compares the counts in IM register 91 and IM counter 93; the output of the comparator is normally low and is energized when the two counts are equal. After 166 IM pulses have been generated, the two counts are equal and comparator 92 pulses its output. The output pulse is extended to the "off" input of IM oscillator 18, and thus immediately after the last P-to-C transition (the last Index Mark), the oscillator turns off. The same pulse resets flip-flop 35. Conductor WG is de-energized and gates 16C, 16P are no longer enabled. Thus the further writing of Index Marks is prevented. The last transition is from the P state to the C state as desired — the first and last segments in the track are initially placed in the C state so that the ZPM pulse (P state) can be distinguished.

The circuit of FIG. 5A is used only once during the entire recording process. A single operation of switch 76 controls the recording of the timing track as shown in FIG. 8(c). Thereafter, the signal recording control unit 104 is used to record the signal tracks. The circuits of FIGS. 5B and 5C are used to control the signal track recordings.

The recording of each signal track occurs in two steps. During the first step, the initial pulses IP are recorded as shown in FIG. 9(a). During the second step, the actual samples are recorded. The circuit operates in two modes when the two steps are performed — mode I and mode II. In both modes, the ZTR2 and IM pulses on conductors 206 and 207 are used to control the recording in the signal track to by synchronized to the timing information contained in the timing track. After the timing signals are recorded, switches SWC-A and SWC-B in FIG. 1 are closed. Clock logic circuit 204 then operates to extend the two types of timing pulses to the signal recording control unit. Conductors 106 and 107 are connected through the two input selector switches SA and SB in the system of FIG. 1 to the two ends of one of the record/read heads RWH1–RWHN in the audio response system. The position of the two switches determines the signal track in which recording takes place.

To record the IP pulses, switch 271 is moved from the position shown in FIG. 5(B) so that it makes contact with the MODE I conductor. A positive potential is thus extended to one input of each of gates 231 and 233. These two gates are thus enabled to the exclusion of gates 232 and 234. (Each of these two latter gates has an input connected to the MODE II conductor, these gates functioning when sample pulses rather than IP pulses are recorded.) Following the correct setting of switch 271, the MANUAL SET switch connected to the set input of "ready" flip-flop 228 is momentarily operated. The flip-flop is placed in the 1 state and its Q output goes high. This enables one input of NAND gate 226. Thereafter, the START MODE I switch is operated to extend the positive potential of source 227 to the second input of the gate. The function of flip-flops 222, 225 and 228 is to control the writing of 167 IP pulses in the selected signal track. The disc rotates so fast (one revolution in 33.3 milliseconds) that the START MODE I switch may still be operated by the time one rotation of the disc has taken place and all of the IP pulses have been recorded. The IP pulses are recorded only as long as the WRITE GATE I conductor is energized, this conductor being extended to a second input of each of gates 231 and 233. The three flip-flops 222, 225 and 228 insure that the WRITE GATE I conductor is energized only for that interval required to record 167 IP pulses, even though though the START MODE I switch may still be operated after all of the IP pulses have been recorded.

When the START MODE I switch is first operated, the output of NAND gate 226 goes low. The negative step applied to the set input of mode I enable flip-flop 225 sets this flip-flop in the 1 state so that the Q output goes high and the $\bar{Q}$ output goes low. Flip-flop 225 is a D-type flip-flop. A negative set pulse causes the Q output to go high as described. A positive step applied to the clock input causes the Q output to switch to a level determined by the potential applied to the D input. Since the D input of flip-flop 225 is grounded, any positive step applied to the clock input causes the Q output of the flip-flop to go low and the $\bar{Q}$ output to go high.

Write gate I flip-flop 222 is initially reset with its Q output being low. (The last clock pulse applied to the flip-flop resets it with the Q output going low since the D input is grounded. As will become apparent below, after the IP pulses are recorded in any signal track flip-flop 222 is reset.) With the Q output low, one input of each of gates 231 and 233 is disabled. Consequently, neither of these gates operates and neither of current switches CSW1–P and CSW2–C can turn on. With flip-flop 225 in the set state, the first ZTR2 pulse applied to the second input of gate 224 causes its output to go low. This causes flip-flop 222 to switch to the set state and the Q output to go high. This enables both of gates 231 and 233. The third input of gate 231 is connected to the $\bar{Q}$ output of the multivibrator over the $\overline{\text{WRITE PHASE I}}$ conductor. Initially, the $\bar{Q}$ output of one-shot multivibrator 230 is high and consequently gate 233 is enabled. The positive potential at its output is extended through gate 236 to turn on current switch CSW2–C. The current from source 237 is extended through this switch and diode 239 to conductor 107. When current switch CSW2–C is operated, C-state recording takes place. Consequently, at the end of the ZPM, when a ZTR2 pulse is detected, C-state recording begins in the signal track which is being operated upon.

At the same time that the ZTR2 pulse is detected on conductor 206, an IM pulse is detected on conductor 207. The positive pulse is applied to the input of one-shot multivibrator 229, this multivibrator being triggered by a positive step. A 3-microsecond positive pulse appears at the output of the multivibrator. The negative step at the trailing edge of this pulse triggers one-shot multivibrator 230. This multivibrator has a period of two-microseconds. During this period, the Q output goes high and the $\bar{Q}$ output goes low. Consequently, gate 231 is enabled rather than gate 233. A positive potential is extended through OR gate 235 to enable current switch CSW1–P rather than current switch CSW2–C. Consequently, P-state recording begins. The P-state recording terminates after two microseconds when the Q output of multivibrator 230 goes low and the $\bar{Q}$ output goes high once again. At this time, C-state recording resumes. Consequently, the first IM pulse causes a 2-microsecond P pulse to be recorded on the signal track. This P pulse (the first IP pulse of FIG. 9(*a*)) begins 3 microseconds after the leading edge of the ZTR2 pulse, that is, 3 microseconds after the trailing edge of the ZPM.

Actually, the pulses on conductor 207 include not only the IM pulse but also the ZTR1 and ZTR2 pulses. The first ZTR2 pulse must result in the triggering of multivibrator 230. But it is preceded by a ZTR1 pulse which occurs 1.5 microseconds earlier. Although this earlier pulse triggers multivibrator 229, the one-shot is of the "integrating" type; it is re-triggered by the ZTR2 pulse. Consequently, multivibrator 230 is triggered 2 microseconds after receipt of the ZTR2 pulse, rather than the ZTR1 pulse.

Thereafter, every IM pulse triggers one-shot multivibrators 229 and 230 in succession, and another 166 IP pulses are recorded in the same manner. The purpose of multivibrator 229 is to delay each IP pulse by 3 microseconds following the start of each segment, the start of each segment being defined by the trailing edge of the ZPM or an IM transition in the timing track. As will be described with reference to the decoders, every IM pulse resets a "stream" with reference to the decoders, every IM pulse resets a "stream" counter. The first sample in each segment is delayed by three microseconds after the start of the segment simply to allow sufficient time for the counter in each of the decoders to reset prior to receipt of the first sample in each segment. The output of each signal track is extended to many decoders and the fan-out can introduce a delay in the transmission of the sample pulses from the read amplifiers RA1–RAN (FIG. 1) to the decoders. The 3-microsecond delay introduced by one-shot multivibrator 229 between the start of each timing track segment and the first sample pulse recorded in the signal track prevents any errors arising from the fan-out delays.

After the last IP pulse has been recorded, two IM pulses are received in succession on conductor 207 corresponding to the leading and trailing edges of the ZPM. The first IM pulse triggers multivibrator 229. It is re-triggered by the second IM pulse. By the time multivibrator 230 is triggered after three microseconds, the WRITE GATE I conductor has gone low as a result of the resetting of flip-flop 222. Consequently, no further recording takes place inasmuch as gates 231 and 233 are disabled. The first ZTR2 pulse causes the Q output of flip-flop 222 to go high to enable the recording of the IP pulses to begin. The second ZTR2 pulse switches the state of the flip-flop so that the recording stops.

When flip-flop 222 is first set, one input of gate 223 goes high. The flip-flop is set in the first place by the first ZTR2 pulse which is extended through gate 224 to the set input of the flip-flop. The flip-flop sets before the first ZTR2 pulse terminates. As soon as the Q output of the flip-flop goes high to enable one input of gate 223, the first ZTR2 pulse is extended through this gate and the output of the gate goes low. The negative pulse at the output of NAND gate 223 clears ready flip-flop 228. Consequently, the Q output of this flip-flop goes low and gate 226 can no longer cause flip-flop 225 to be placed in the set state even if if the START MODE I switch remains closed. The negative pulse at the output of gate 223 is also extended to the clock input of flip-flop 225. Recalling that a D-type flip-flop can switch state when a positive step is applied to its clock input, it is apparent that at the trailing edge of the negative pulse at the output of gate 223 flip-flop 225 is reset since the D input is grounded. The Q output goes low and gate 224 is disabled. Consequently, it is only the first ZTR2 pulse which is transmitted to the set input of flip-flop 222.

With the resetting of flip-flop 225, the $\bar{Q}$ output goes high to enable one input of gate 221. When the first ZTR2 pulse is first received, the $\bar{Q}$ output of flip-flop 225 is low and consequently the output of gate 221 remains high. Although the negative pulse at the output of gate 223 is inverted by inverter 220 to apply a positive pulse to the other input of gate 221, this has no effect on the gate since the input connected to the $\bar{Q}$ output of flip-flop 225 remains low. At the end of the first ZTR2 pulse, the $\bar{Q}$ output of flip-flop 225 goes high to enable one input of gate 221. However, the output of gate 223 is now high and thus inverter 220 applies a low input to the second input of gate 221. Consequently, the output of the gate remains high.

The second ZTR2 pulse is not extended through gate 224 to the set input of flip-flop 222 since the gate is disabled with the trailing edge of the first ZTR2 pulse when flip-flop 225 resets. However, the second ZTR2 pulse is extended through gate 223 and causes its output to go low. The negative pulse is inverted by inverter 220 to apply a positive pulse to one input of gate 221. Since the $\bar{Q}$ output of flip-flop 225 is now high, both inputs of the gate are high and a negative pulse appears at the output of the gate. At the trailing edge of the second ZTR2 pulse, the positive step applied to the clock input of flip-flop 222 causes it to reset since the D input is grounded. The Q output goes low to disable gates 231 and 233. Consequently, after one rotation of the disc, the IP-pulse recording circuitry turns off — even though the operator may still be holding closed the START MODE I switch.

After the mode I operation, switch 271 is moved to the mode II position so that gates 232 and 234 are enabled rather than gates 231 and 233. The output of write gate II flip-flop 35, the WRITE GATE II conductor, is extended to one input of each of gates 232 and 234. It is only when flip-flop 35 is set in the 1 state that one of the two gates can operate and a sample pulse can be recorded. Which of the two gates is operated depends on the state of flip-flop 250. This flip-flop has two output conductors, WRITE PHASE II and $\overline{\text{WRITE PHASE II}}$. The first conductor is connected to an input of gate 232 and consequently when the write gate II flip-flop 35 is in the 1 state and flip-flop 250 is similarly in the 1 state during mode II recording, gate 232 energizes its output to close current switch CSW1–P. In such a case, P-state recording takes place. On the other hand, if flip-flop 250 is in the 0 state, gate 234 operates so that current switch CSW2–C closes to control C-state recording.

Read amplifier 13 is connected across conductors 106 and 107. This amplifier detects transitions in the state of the signal track being recorded and energizes one of its two output conductors depending on the direction of the transition. If the transition is from the C state to the P state, one input of gate 40P is energized, while if the transition is from the P state to the C state, one input to gate 40C is energized. In either case, one of the gates is enabled to operate only if conductor RG is energized. The function of diodes 238 and 239 is to isolate the two switches CSW1–P and CSW2–C from the record/read head to which they are connected when the state of the signal track is being read.

The output of gate 40P is connected to the set input of flip-flop 250. Whenever a transition from the C the operates since at this time conductor state to the P state is detected it is an indication that the next pulse to be recorded should be a P pulse, since the track has been placed in the P state in anticipation of thene next pulse to be recorded. For example, referring to FIG. 9(*c*), after pulse $A_{21}$ has been recorded in segment 1, it will be recalled that a 1.5 microsecond delay (P) pulse is recorded on the track. During the next pass, while the $A_{21}$ pulse is being read, the WRITE GATE II conductor is de-energized so that no recording can take place. As soon as the end of the pulse is detected — with a transition from the C state to the P state, gate 40P OPERATES SINCE AT THIS TIME CONDUCTOR RG is energized as will be described below. Flip-flop 250 is placed in the 1 state so that when the WRITE GATE II conductor is energized pulse $A_{31}$ will be written in the P state. As will be described below, the WRITE GATE II conductor is energized immediately after the transition is detected. But it takes some time before current switch CSW1–P turns on. This is the reason for recording the delay pulse in the first place — immediately after pulse $A_{21}$ is first recorded, the track is placed in the P state in anticipation of the next P pulse to be recorded. With flip-flop 250 in the 1 state, as soon as the WRITE GATE II conductor is energized a P pulse ($A_{31}$) is recorded over the original delay (P) pulse. At the end of the pulse, as will be described below, flip-flop 250 is switched to the 0 state (with the pulsing of its clock (C) input) so that the trailing portion of the previously recorded delay pulse is switched back to the C state, as shown in FIG. 9(*d*), in preparation for the recording of the next C pulse ($A_{41}$).

Similarly, the detection of a transition from the P state to the C state results in the operation of gate 40C and the placement of flip-flop 250 in the 0 state. As soon as the WRITE GATE II conductor is energized, recording in the C state begins. For example, to record pulse $A_{21}$ (FIG 9(c)), the P-to-C transition at the end of the $A_{11}$ pulse is detected and flip-flop 250 is placed in the 0 state. The WRITE GATE II conductor is then energized and recording in the C state beings. Of course, the track is already in that state so there is no change in the actual state okf the track. However, at the end of the recording of pulse $A_{21}$, the state of flip-flop 250 is switched (by a pulse at its C input) and a 1.5-microsecond delay (P) pulse is recorded. At the end of the pulse, the WRITE GATE II conductor is de-energized and the remainder of segment 1 of the track is left in its initial C state.

Before the mode II recording begins, switch 272 is closed to reset " full" flip-flop 39. This flip-flop is set only when one of the segments on the signal track has been filled up by sample pulses. When the flip-flop is set in the 1 state, lamp 97 is energized to indicate that no further recording can take place in the track. Initially, however, since no samples are recorded in the track, the flip-flop is manually reset. With the 0 output of the flip-flop high, one input of gate 121 is enabled. Switch 99 is then operated. This switch is the MODE II CONTROL switch and it is operated only momentarily to start the mode II recording. The potential of source 98 is extended to the second input of gate 121 and the output of the gate goes high. This causes one input of gate 23 to be enabled. Because the high output of gate 121 is inverted by inverter 22, one input of gate 24 is held low. The MODE II CONTROL switch must be maintained closed throughout the sample pulse recording process.

Before switch 99 is closed, the output of gate 121 is low and the output of inverter 22 is high to enable one input of gate 24. The ZTR2 pulses which are applied to the other input of gate 24 are extended through the gate to the reset input of sample gate flip-flop 37. The 0 output of the flip-flop is thus high and the high potential is extended through OR gate 260 to the reset input of flip-flop 35 to keep this flip-flop in the 0 state. Consequently, the WRITE GATE II conductor is low and no writing can take place. The 0 output of the sample gate flip-flop is also connected to the set input of read gate flip-flop 36. A high potential at the set input of the read gate flip-flop keeps the 1 output high so that conductor RG is energized. This in turn enables the operation of gates 40P and 40C so that flip-flop 250 can track the state of the signal track to be recorded.

After switch 99 is closed, the output of gate 121 goes high. This disables gate 24 but enables gate 23. The ZTR2 pulses are now extended through gate 23 to the set input of the sample gate flip-flop. The flip-flop is set in the 1 state by the trailing edge of the first ZTR2 pulse to occur after switch 99 is closed. The 0 output of the flip-flop goes low so that flip-flop 35 is no longer held in the 0 state and flip-flop 36 is no longer held in the 1 state — although both flip-flops remain in their initial states until they are switched. When the sample gate flip-flop is set in the 1 state, conductor SG goes high to enable one input of each of gates 19, 27 and 31. The SG conductor remains energized throughout the recording process until the sample gate flip-flop is reset. Since the SG conductor does not go high until the trailing edge of the ZTR2 pulse, at no time during receipt of the first ZTR2 pulse does gate 27 have both of its inputs enabled. Consequently, the output of the gate remains low until the next ZTR2 pulse is received.

The output of each of gates 40C, 40P is extended to one of the inputs of OR gate 14. Each time amplifier 13 detects a transition in the state of the track being operated upon, if flip-flop 36 is in the 1 state and conductor RG is energized, a short pulse appears on the TR conductor at the output of OR gate 14. The TR pulse is short in duration (in the order of a few tenths of a microsecond).

The analog signal to be recorded, in this case an audio signal, is extended from source 86 to amplitude-to-time converter 32. The signal to be recorded in the usual case consists of a single word. The operator controls the recording of the signal in particular successive information streams on the disc by manually setting a number in unit 84 which is one less than the number of the first information stream. If the word to be recorded is the first on the track, the manual load operation results in the placing of zero in stream address buffer counter 30 to indicate that recording of the signal being processed should begin with the recording of the first pulse in each segment. It may take a number of information sreams to record the signal. As will be described below, after each information stream is recorded stream address buffer counter 30 is incremented. Consequently, at the end of the recording the count in unit 30 represents the total number of information streams recorded for the signal. If the number is 4, for example, it is an indication that 4 × 167 or 668 samples were required. The next signal to be recorded begins in the fifth information stream on the disc. For the recording of the next signal the number 4 need not be loaded manually in stream address buffer counter 30 under control of unit 84; the number 4 is already in the counter. Unit 84 includes read-out lamps so that the operator can determine the last information stream on the disc which has been recorded at the end of each signal recording. This information is required for read-out purposes. If the entire track is recorded at the same time, there is no need to manually change the count in counter 30. However, in the event only a part of a track is recorded and it is subsequently desired to resume recording, for example, beginning with the tenth information stream, the number 9 would be manually loaded into stream address buffer counter 30 so that the next signal to be recorded would start in the tenth information stream.

When gate 31 operates, a pulse is extended to the start input of converter 32. A start command to the converter causes it to apply a pulse at its output whose duration corresponds to the instantaneous amplitude of the signal at the sample time. Even though the signal continuously changes, since it is in the kHz range and the maximum width of the output pulse from the converter is 1.5 microseconds, the pulse is generated almost instantaneously relative to the changing signal. Any of many well known amplitude-to-time converters can be used for unit 32. The pulse at the output of the converter is designated the ATC pulse. Stream counter 28 counts the number of TR pulses generated by OR gate 14. The counter increments on the trailing edge of each TR pulse. The counter is reset by each IM pulse.

The SG conductor is connected to one input of AND gate 27. Although this conductor goes high with the generation of the first ZTR2 pulse after switch 99 is closed, it goes high at the trailing edge of the ZTR2 pulse. Consequently, AND gate 27 does not operate with the generation of the first ZTR2 pulse because the pulse terminates by the time conductor SG goes high. It is only starting with the second ZTR2 pulse that gate 27 pulses its output which is connected to the increment input of stream address buffer counter 30. This is the desired operation — stream address buffer counter 30 must be incremented only after each rotation of the disc to indicate the number of the last recorded information stream.

Comparator 29 energizes its output only when the counts in counters 28 and 30 are equal. Initially, stream address buffer counter 30 has a count of zero in it, as does stream counter 28 since the latter is reset by the IM pulses which occur regularly. Although a TR pulse is generated with the leading edge of the first IP pulse on the signal track, stream counter 28 increments only on the trailing edge of the TR pulse. Thus, initially the output 85 of comparator 29 is high to energize the second input of gate 31. The first TR pulse which is generated is extended to the third input of gate 31 and causes the gate to operate. Converter 32 generates the first ATC pulse corresponding to the amplitude of the signal at that time. Of course, audio source 86 must begin to operate at the same time that switch 99 is closed so that the first TR pulse which is effective to cause a sample to be taken will cause the signal to run. (Audio source 86 is typically a tape playback unit.) the same switch 99 can be used to start source 86, as will be understood by those skilled in the art.

Since conductor SG is energized throughout the recording process, one input of gate 19 is energized. The ATC pulse at the output of converter 32 is connected to the other input of the gate and is thus extended through the gate to the clock input of flip-flop 250. Since read gate flip-flop 36 was set and held in the 1 state by the sample gate flip-flop 37, flip-flop 250 is switched back and forth in phase with the state of the track. The flip-flop changes state when a negative step is applied to its C (clock) input. This occurs at the end of the ATC pulse when the output of gate 19 goes low. Consequently, at the end of the ATC pulse, provided write gate flip-flop 35 is in the 1 state, the C polarity will be recorded on the track (over-writing the trailing portion of the initial IP pulse)— the P region (pulse sample $A_{11}$) being dependent on the width of the ATC pulse, which in turn is dependent upon the amplitude of the signal.

However, in order for all of this recording to take place, the write gate II flip-flop 35 must be switched to the 1 state to energize the WRITE GATE II conductor. When gate 31 first operates with the generation of the first TR pulse, its output not only starts the operation of converter 32, but it is also extended to the trigger input of one-shot multivibrator 251. The output of the multivibrator, a 0.1-microsecond positive pulse, is extended to the set input of write gate II flip-flop 35. The output is also extended to the reset input of read gate flip-flop 36. Consequently, read gates 40P, 40C turn off and write gates 232 and 234 are enabled. Flip-flop 36 resets on the leading edge of the multivibrator; flip-flop 35 sets on the trailing edge. This allows the read gates to turn off before any write currents are generated. At the end of of the ATC pulse, flip-flop 250 switches to the 0 state and the C polarity is recorded.

Referring to FIG. 9(*c*) it will be recalled that after a C-to-P transition at the end of a sample pulse, it is desired to record the P state for 1.5 microseconds. When flip-flop 250 is switched to the 1 state and P recording beings after the storing of an even number sample in any segment, 1.5 microsecond delay unit 33 begins to operate — at the tailing edge of the ATC pulse. After 1.5 microseconds, one-shot multivibrator 34 is triggered. This multivibrator simply generates a 1-microsecond pulse which is applied through OR gate 260 to the reset input of write gate flip-flop 35, and is applied directly to the clock input of read gate flip-flop 36. The write gate flip-flop is reset so that gates 232 and 234 are disabled. Since the write gate flip-flop is reset 1.5 microseconds after the termination of the ATC pulse, it is apparent that the P state is recorded on the track for only 1.5 microseconds after the C-to-P transition at the end of an even number pulse sample in any segment. With the turning off of write gate 232, the track is left in the C state as shown in FIG. 9(*c*). The read gate flip-flop 36 is set immediately thereafter (a negative step at the clock input switches the flip-flop to the 1 state) to allow flip-flop 250 to track the state of the track in the usual manner.

Flip-flops 35 and 36 are designed such that write flip-flop 35 is reset in the 0 state with the application of a positive step to its R input while read gate flip-flop 36 is set in the 1 state with the application of a negative step to its clock input. This allows the leading edge of the 1-microsecond pulse from multivibrator 34 to switch write gate 35 to the 0 state while it is the trailing edge of the same pulse which sets the read gate flip-flop in the 1 state. This permits all recording transients to die down before read gates 40C, 40P are enabled by flip-flop 36.

The disc continues to rotate after sample $A_{11}$ is recorded. At the end of of the first segment, an IM pulse resets stream counter 28. Although the first TR pulse (leading edge of first IP pulse) increments stream counter 28, it does so only at the trailing edge of the pulse. Consequently, when the second TR pulse is generated (with the leading edge of the IP pulse in segment 2) the counts in both of counters 28 and 30 are still zero and the output of comparator 29 is high. The TR pulse generated with the detection of the leading edge of the IP pulse causes gate 31 to operate and another sample to be taken. At this time sample $A_{12}$ is stored. It will be recalled that at the end of the recording of the $A_{11}$ pulse, flip-flop 250 was left in the 0 state. But because read gate flip-flop 36 is in the 1 state, flip-flop 250 follows the state of the track. This when the leading edge of the IP pulse in the second segment is detected, the flip-flop is switched to the 1 state and sample $A_{12}$ is stored in the form of a P state. At the end of the sample, the output of gate 19 goes low and flip-flop 250 switches to the 0 state. At this time, C recording takes place for the 1.5-microsecond delay interval once again; but it is not "visible" since the track is already in the C state.

The third recording process begins with the detection of TR pulse when the third IP pulse passes underneath the record/read head. Sample $A_{13}$ is recorded just as are samples $A_{11}$ and $A_{12}$, except that the width of the pulse depends on the width of the third ATC pulse, which in turn is a function of the amplitude of the audio signal at the time the sample is taken.

The process continues with one sample being recorded in each segment. At the end of the first pass of the disc, a ZTR2 pulse is extended through gate 27 to increment stream address buffer counter 30. It will be recalled that the first ZTR2 pulse did not increment the counter inasmuch as the SG input to gate 27 went high only at the trailing edge of the first ZTR2 pulse. But the second ZTR2 pulse is extended through gate 27 and its leading edge increments stream address buffer counter 30. A count of 1 is now stored in the counter. Since stream counter 28 is in the 0 state (it is reset by every IM pulse), the output of comparator 29 is low and gate 31 is not enabled.

The next TR pulse (3 microseconds after the ZTR2 pulse) is applied to the increment input of stream counter 28. However, it will be recalled that the stream counter increments only on the trailing edge of the TR pulse. Consequently, it is only at the trailing edge of the TR pulse that the counts in counters 28 and 30 are equal. It is only at this time that the output of comparator 29 goes high to energize an input of gate 31. But by this time the TR pulse has terminated so that gate 31 does not operate. In this manner, a sample is not taken during the second pass when the leading edge of the first sample is detected.

However, at the trailing edge of the $A_{11}$ pulse already recorded, another TR pulse is generated. This pulse is transmitted through gate 31 to cause a sample to be taken Thus, pulse $A_{21}$ is recorded on the track immediately after sample $A_{11}$. The actual recording of the pulse with the switching of flip-flop 250 and the generation of the delay pulse is the same in all cases. The only difference from pass to pass is when the new sample is taken for recording in each segment. (Successive information streams are, of course, recorded in alternating magnetic polarity states on the disc.) During the second pass, the sample is taken when the trailing edge of the first pulse is detected.

After pulse $A_{21}$ is recorded, the next IM pulse causes stream counter 28 to reset. The next TR pulse which is detected is that which occurs at the leading edge of the first sample in the second segment. Since stream counter 28 contains a count of zero while buffer counter 30 contains a count of 1, the output of comparator 29 is low and gate 31 does not operate. Although stream counter 28 increments to a count of 1 at the trailing edge of the TR pulse and the output of comparator 29 goes high, by this time the TR pulse has terminated and gate 31 cannot operate.

However, at the trailing edge of pulse $A_{12}$, another TR pulse is generated. At this time, since the output of comparator 29 is high, gate 31 operates and sample $A_{22}$ is taken and recorded.

Stream counter 28 is reset by the next IM pulse and it is only at the trailing edge of pulse $A_{13}$ that the TR pulse which is generated causes another sample to be taken and pulse $A_{23}$ to be recorded.

This process continues and samples $A_{21}$ through $A_{2M}$ are recorded just as were samples $A_{11}$ through $A_{1M}$. The only difference is that it is the second TR pulse detected for each segment that triggers gate 31.

The next ZTR2 pulse which is generated increments stream address buffer counter 30 to a count of 2. It is thus apparent that two TR pulses must be detected for each segment before the count in stream counter 28 matches that in stream address buffer counter 30. Since it is the trailing edge of each Tr pulse that increments counter 28, it is only the third TR pulse that causes a sample to be taken. The third TR pulse occurs at the end of the second sample recorded in each segment. Similarly, during succeeding passes, a sample is recorded in each segment only immediately after the last recorded sample.

It is apparent that while samples $A_{11}$ through $A_{1M}$ occur at 200-microsecond intervals, the same is not true of subsequent samples. The time at which each sample is taken during the pass of a segment underneath the record/read head depends on the total width of the pulses already recorded in that segment. It is only after a sufficient number of TR pulses have been counted in a segment that a sample is taken. If all of the samples in a particular segment are relatively short while all of the samples in the succeeding segment are relatively long, the time between the two samples next recorded in these two segments will be longer than 200 microseconds since the disc will have to rotate for a time period longer than 200 microseconds until the last previously recorded pulse in the succeeding segment is passed. However, the slight variations in time spacings is of no importance because the sampling rate is high enough in the first place to provide a margin of safety for the proper reconstruction of the signal. As will become apparent below, the samples which are read from the disc by a decoder are also controlled by counting pulses in segments. Consequently, they are not read out at a fixed rate but rather as a function of the total width of the earlier recordings in the same segment. Since the pulses are read out with the same time spacings as they are recorded, the signal can be reconstructed with no further consideration being given to inter-pulse spacings.

When the signal to be recorded is over, switch 99 is opened. (This can be controlled automatically by the signal source itself as will be apparent to those skilled in the art). The output of gate 121 goes low to disable gate 23. At the same time, the output of inverter 22 goes high to enable gate 24. The next ZTR2 pulse which is generated is transmitted through gate 24 to reset sample gate flip-flop 37. Conductor SG goes low at this time. With conductor SG low, gates 27 and 31 cannot operate. With gate 31 remaining disabled, no further samples are taken. Write gate flip-flop 35 is held in the 0 state and read gate flip-flop 35 is held in the 1 state by the output of flip-flop 37. The count in stream address buffer counter 30 represents the address of the last information stream which was required to record the signal. The ZTR2 pulse which resets sample gate flip-flop 37 in the first place is transmitted through AND gate 27 since it is applied directly to this gate and gets through the gate before conductor SG goes low. This causes the stream address buffer counter 30 to advance. This is the desired operation since the stream address buffer counter should be incremented; the counter is incremented at the end of the recording of each information stream and another information stream has indeed been recorded.

It should be noted that in the event the signal terminates before the end of a pass of the disc, the opening of switch 99 does not prevent samples from being recorded. It must not prevent samples from being recorded because otherwise all of the segments would not contain the same number of samples and erroneous recordings would be made of subsequent signals. The opening of switch 99 results in gate 23 turning off but does not result in gate 24 turning on. It is only the next ZTR2 pulse which causes gate 24 to turn on and to terminate the recording process. The earlier turning off of gate 23 has no effect on the system because the energized 1 output of flip-flop 37 keeps conductor SG high. Consequently, samples are still recorded on the track in the last segments of the last information stream being recorded. However, each of these samples is of the same width since the audio level is constant.

At the end of the recording of the first signal, stream address buffer counter 30 represents a number which is the last information stream used to record the signal. This number can be written down by the operator. Suppose it is three (corresponding to signal A in FIG. 2) and the initial count loaded into stream address buffer counter 30 was zero (when the recording is begun with a "clean" track). This is an indication that the next signal to be recorded, whatever it is, will begin with information stream 4 on the same track. The operator simply writes down this information so that to read out the second signal, for example, signal B of FIG. 2, information stream number 4 in the particular track must be identified. At the end of the recording of signal B, to be described below, the count in stream address buffer counter 30 will represent the number of the last information stream used to record signal B. Suppose this number is 7. Since the first information stream containing signal B is the number 4 and the last is number 7, to read out signal B to the exclusion of all other signals all that is required is for the computer to transmit to a decoder (FIG. 1) the identification of the track number containing signal B, the first information stream (number 4) containing the signal, and the total number of information streams in which the signal is recorded (in this case, four information streams — numbers 4, 5, 6 and 7). In a similar manner, the information stream addresses of all signals which are recorded can be noted since the count in counter 30 is indicated by the readout lamps in unit 84 at the end of each signal recording.

To record samples of signal B, switch 99 is closed together with the turning on of audio source 86. The first ZTR2 pulse which follows the closing of switch 99 causes sample gate flip-flop 37 to turn on and signal SG to go high. (Once again, the first ZTR2 pulse is not transmitted through gate 27 to increment stream address buffer counter 30. This counter is incremented only after each information stream is recorded). Since stream address buffer counter 30 has not been reset, the storage cycle does not begin until the samples of signal A stored in the first segment have passed the record/read head. It is only after the TR pulse corresponding to the leading edge of the last sample in the first segment is detected that the count in stream counter 28 equals the count stored in buffer counter 30. And since the stream counter is incremented by the trailing edge of the TR pulse, gate 31 does not operate with the generation of this TR pulse. However, now that the counts in counters 28 and 30 match, it is when the next TR pulse is generated — at the trailing edge of the last recorded sample (the leading edge of the new sample to be recorded) — that gate 31 operates. Thus sample $B_{11}$ is stored adjacent to the first sample of the last information stream of signal A as shown in FIG. 9(*e*). For all intents and purposes, the system does not know that signal B is not part of the same signal A already recorded. The system always operates in the same way — when any segment is operated upon, a new sample is not recorded until a number of samples is counted which equals the number of samples known to be recorded already in the segment.

Additional signals may be stored following signal B until the storage capacity of the track being operated upon is exhausted. This condition is detected automatically. At the end of each sample storage cycle, the output pulse from multivibrator 34 is applied to the input of one-shot multivibrator 110. The output of this multivibrator goes high for 10 microseconds to enable the input of gate 38. If an IM pulse occurs while miltivibrator 110 has its output energized, it is an indication that the last sample has been recorded relatively close to the leading edge of the first sample in the next segment. When an IM pulse is detected within 10 microseconds of the last operation of multivibrator 34, gate 38 sets full flip-flop 39 in the 1 state. At this time, lamp 97 goes on to indicate that the track is full. At the same time, the 0 output of the flip-flop goes low to disable gate 121. Thus even if switch 99 is still closed, no additional information streams are recorded after the last one in progress. Even though the input signal may not have finished, it is better to cut it off than to record it over the first signal recorded on the track which might happen if the recording process were allowed to continue. With the setting of flip-flop 39, the recording process is terminated at the end of the current information stream just as though switch 99 were opened at the end of the recording of a signal. With the energization of lamp 97, the operator is informed that the last signal has not been fully recorded. The operator may the re-record the entire track, or perhaps only the last word, after first selecting a shorter word for the last word.

It should be noted that a sample recorded in any segment may control the setting of flip-flop 39 in the 1 state. When the samples recorded in any segment approach the next segment further recording should be prevented. Any one of the 167 segments can be the one which is filled up first if large-width pulses happen to be recorded in it. Consequently, provision is made to allow the filling up of any segment to terminate the recording process in the track being operated upon. Every sample recorded results in the triggering of multivibrator 110. If an IM pulse is detected within 10 microseconds, indicating that the first sample in the next segment is very near the record/read head, the recording process is terminated.

Figure 6:
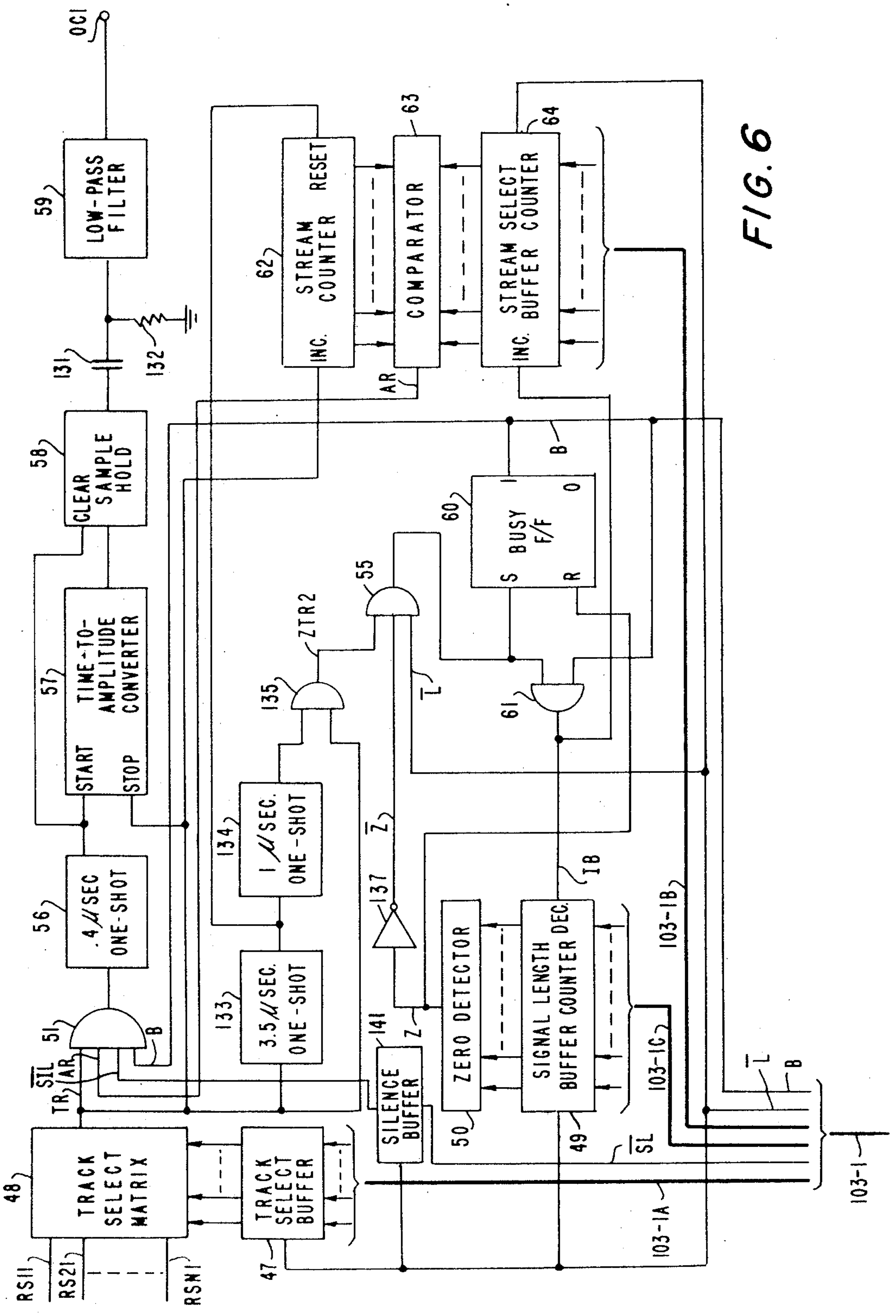
FIG. 6 is the same as FIG. 5 of the Emerson et al application and depicts schematically a decoder used in the Emerson et al system.

FIG. 6 depicts the elements contained within a decoder of the Emerson et al system. The decoder includes a respective input RS11 – RSN1 from each of the record/read heads associated with the disc. During playback, a succession of pulses appears on each of the N conductors extended to track select matrix 48.

A cable 103–1 is extended between signal select control 102 of FIG. 1 and decoder 1. Cable 103–1 contains the following cables and conductors:

1. Cable 103–1A: Data representative of the track containing the desired word is transmitted from the signal select control (computer, etc.) to track select buffer 47. This is the first item of information necessary to identify any word stored on the disc. The data is stored in buffer 47 when conductor $\overline{L}$, connected to its loading input, goes low.
2. Cable 103–1B: Data is transmitted from the signal select control 102 to stream select buffer counter 64. The data stored in the buffer counter represents the first information stream in the selected track which contains samples of the desired word. This is the second item of information necessary to identify any word, and is stored when conductor $\overline{L}$ goes low.
3. Cable 103–1C: The data transmitted over this cable to signal length buffer counter 49 represents the number of information streams which were required to store samples of the desired signal, i.e., the number of information streams which must be processed to read out the signal. This is the third item of information which is required to completely identify all samples of a word. Buffer counter 49 is also loaded when conductor $\overline{L}$ goes low.
4. Conductor $\overline{L}$: A signal is transmitted from the signal select control unit over this conductor to prevent operation of the decoder. Normally, conductor $\overline{L}$ is high in potential to control the continuous functioning of the decoder. However, during the loading of track select buffer 47, stream select buffer counter 64 and signal length buffer counter 49, it is desirable to prevent the operation of the decoder. The start of the operation of the decoder for each new word is delayed until all three units have been loaded. For this reason, at the start of the loading, conductor $\overline{L}$ goes low both to control loading of units 47, 49 and 64, and to prevent outputting of the selected word on output channel OC1. Immediately after the loading, conductor $\overline{L}$ goes high to enable the operation of the decoder.
5. Conductor $\overline{SL}$: This conductor is normally high to enable operation of the decoder. However, if it is desired to inhibit the outputting of signals from the decoder for a specified length of time, the conductor is made to go low by signal select control 102. It is thus possible to inject a pause wherever desired in the output, as will be described below.
6. Conductor B: Whenever the decoder is "busy" outputting a signal on channel OC1, busy flip-flop 60 is in the set state. Its 1 output is high and conductor B is energized. At the end of the outputting, the flip-flop is reset and conductor B goes low. This enables signal select control 102 to determine when the decoder has completed outputting a requested waveform so that additional output instructions may be given if desired. This type of control enables signal select control 102 to load the decoder without subsequent continuous monitoring of it.

Each of read amplifiers RA1–RAN in FIG. 1 provides a succession of short TR pulses on its respective output conductor RS1–RSN; each magnetic state transition on the respective track of the disc results in a TR pulse. Track select matrix 48 is of any conventional design and simply causes one of conductors RS11–RSN1 to be connected to output conductor TR in accordance with the data contained in track select buffer 47. For example, if track select buffer 47 contains data representing track N on the disc, conductor RSN1 is connected through matrix 48 to conductor TR, that is, to one input of AND gate 51. A succession of pulses appears on conductor TR, each pulse corresponding to the passing of a magnetic state transition under record/read head RWHN.

In the Emerson et al system, there is no separate timing track. Instead, every signal track has recorded on it, in addition to sample pulses, both ZPM and IM information. The detected transition pulses (TR) are used both to derive all of the timing information and the sample levels. Each ZTR2 pulse coincides with the leading edge of the first sample in the first segment. An IM pulse coincides with the leading edge of the first sample in every segmant. One-shot multivibrators 133 and 134, and gate 135 operate on the TR pulses to derive ZTR2 pulses at the output of gate 135. Multivibrator 133 further functions to produce at its output a pulse prior to each new segment reaching the record/read head. This pulse is called as SSR pulse in the Emerson et al application.

Figure 7:
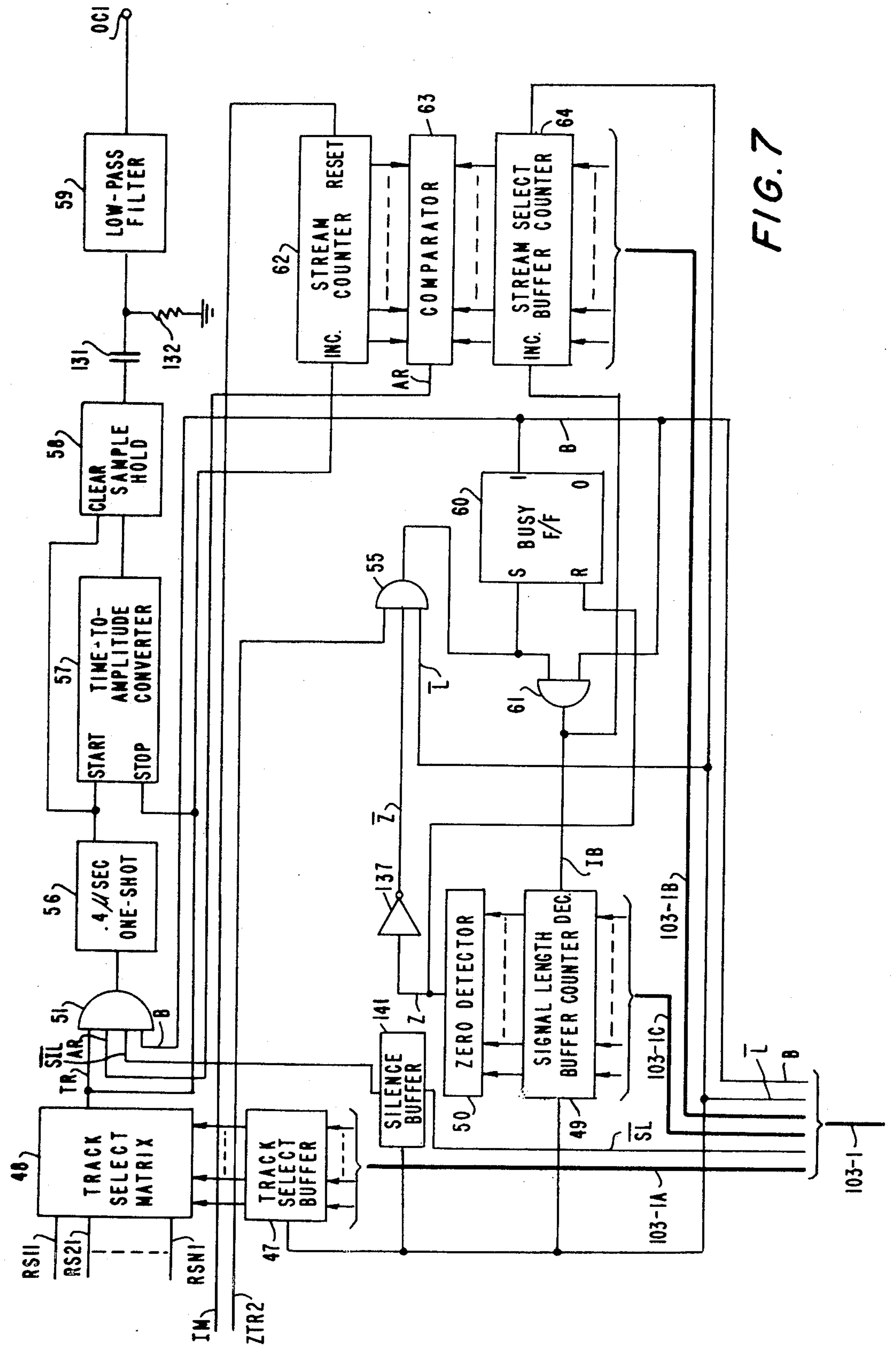
FIG. 7 depicts schematically decoder 101–1 of FIG. 1.

FIG. 7 depicts a decoder designed in accordance with the principles of the present invention. Instead of requiring elements 133–135 to derive ZTR2 and SSR pulses, these elements are omitted and ZTR2 pulses from the common "clock logic" 204 are extended directly to an input of gate 55 in each decoder; also, IM pulses are applied directly to the reset input of stream counter 62 in lieu of derived SSR pulses. The IM pulses utilized in the decoder of FIG. 7 are comparable to the SSR pulses in the decoder of FIG. 6; the important characteristic of both types of pulses is that they occur between the samples stored in successive segments.

Signal length buffer counter 49 contains a number representative of the total number of information streams which contain samples of the desired word. The signal length buffer counter controls zero detector 50 to maintain conductor Z at a low level in the absence of a zero in the buffer counter. At the start of the decoding sequence, conductor Z is low, and the output $\overline{Z}$ of inverter 137 is high. This enables one input of gate 55. Conductor $\overline{L}$ goes high immediately after the loading of the data in the three buffers. Consequently when the decoding process is to begin a second of the inputs of gate 55 is enabled. When the first ZTR2 pulse is received following the going high of conductor $\overline{L}$, gate 55 pulses its output. At the trailing edge of the pulse at the output of gate 55, busy flip-flop 60 is set in the 1 state. Conductor B goes high to inform the signal select control that the decoder has begun outputting. Conductor B is extended to one input of gate 61. The output of gate 55 is extended to the other input of gate 61. The ZTR2 pulses are extended through gate 55 and then gate 61 to the decrement input of signal length buffer counter 49. However, the first ZTR2 pulse which occurs after conductor $\overline{L}$ goes high is not extended through gate 61. This is because it is the trailing edge of the pulse at the output of gate 55 that sets busy flip-flop 61 in the 1 state. By the time conductor B goes high to enable one input of gate 61, the ZTR2 pulse at the output of gate 55 has terminated. It is only starting with the second ZTR2 pulse that conductor IB is pulsed to decrement the count stored in signal length buffer counter 49. It is apparent that since signal length buffer counter 49 contains the total number of information streams which must be operated upon, if the signal length buffer counter is decremented following each pass of the disc underneath the record/read head, when the count contained in the counter is zero it is an indication that the complete word of interest has been outputted. However, the counter should be decremented only following the read-out of each information stream. Gate 55 pulses its output at the end of each pass when a ZTR2 pulse is detected to control the decrementing of counter 49. However, the counter is not decremented when the first ZTR2 pulse is detected because no information stream has yet been read out.

Stream select buffer counter 64 contains a number identifying the first information stream to be processed. Following each pass of the disc underneath the record/read head, the count in the counter is incremented so that the next information stream can be processed during the next pass.

Since the IM pulses are extended to the reset input of stream counter 62, the stereaam counter is reset to zero prior to the passing of each segment underneath the record/read head. Thereafter, successive TR pulses applied to the increment input of the stream counter cause the counter to advance. When the count in counter 62 equals that in stream select buffer counter 64, the output of comparator 63 goes high. When conductor AR goes high in this manner, it enables one input of gate 51. This is an indication that the next sample to be read should be operated upon. Since counter 64 represents the information stream to be operated upon, it is apparent that by incrementing stream counter 62 as successive TR pulses are detected in each segment, eventually conductor AR will be energized during the reading of each segment just before the correct sample is read out. Stream counter 62 increments on the trailing edge of each TR pulse. If the output of comparator 63 goes high at this time, it is apparent that gate 51 cannot operate because the TR pulse has already terminated. The gate operates only when the next TR pulse is detected.

Suppose that the first information stream in a track is to be read out. In such a case, stream select buffer counter 64 is loaded with a value of zero; in general, the stream select buffer counter is loaded with a number equal to one less than the number of the first information stream to be processed. (Alternatively, the information streams can be thought of as starting with the number zero.) Stream counter 62 is reset by an IM pulse, the counts in both of counters 62 and 64 are zero and conductor AR goes high even before the first TR pulse is detected in the next segment. Thus, gate 51 operates to transmit the first TR pulse to the input of multivibrator 56. On the other hand, suppose the third sample is to be read. In such a case, stream select buffer counter 64 contains a count of two. The first two pulses increment stream counter 62 to a value of two. Although both counts are now equal, gate 51 does not operate until the third TR pulse is detected since counter 62 only increments on the trailing edge of each TR pulse. Since the third TR pulse occurs at the start of the third sample, it is apparent that the correct sample is read.

It should be noted that each ZTR2 pulse increments stream select buffer counter 64 except the first. As discussed above, the output of gate 61 goes high only starting with the detection of the second ZTR2 pulse. Thus, during the first pass of the disc, stream select buffer counter 64 contains the initial count as desired. It is incremented only at the end of each pass to identify the next successive information stream to be read out.

Since it is the trailing edge of each TR pulse that increments stream counter 62, conductor AR goes high to enable gate 51 while the sample before the sample of interest is being read out. It is the next TR pulse — at the start of the sample of interest — which is transmitted through gate 51. Conductor AR remains high until stream counter 62 is incremented once again. And since it is not incremented until the trailing edge of the TR pulse of interest, it is apparent that this pulse is transmitted to the input of one-shot multivibrator 56.

With conductors B and $\overline{SIL}$ both high (as will be described below), the first TR pulse which is detected following conductor AR going high is transmitted through gate 51 to trigger one-shot multivibrator 56. The output of the multivibrator goes high for 0.4 microseconds. The output of the multivibrator is connected to both the clear input of sample hold circuit 58 and the start input of time-to-amplitude converter 57. Both of these circuits may be of many well known types. The leading edge of the 0.4 microsecond output pulse from multivibrator 56 clears the sample hold circuit. The trailing edge of the pulse causes converter 57 to start operating. The TR output of matrix 48 is extended to the stop input of the converter. The leading edge of each TR pulse causes the converter to stop operating if it was previously operating.

When converter 57 has a negative step applied to its start input, its output voltage, connected to the input of sample hold circuit 58, starts to increase in the form of a ramp. The leading edge of the next TR pulse applied to its stop input causes the output voltage to stop increasing. The sample hold circuit, which is cleared with the start of the time-to-amplitude conversion, maintains a potential at its output equal to the maximum potential reached at the output of the converter. The output of the converter decays some time before the next sample is operated upon (approximately 200 microseconds later) but the output of the sample hold circuit is maintained. Consequently, the output of the sample hold circuit is at a level which is proportional to the duration of the sample recorded on the track. Approximately every 200 microseconds, the output of sample hold circuit 58 is changed to correspond the the last sample read.

It will be recalled that the minimum pulse width (corresponding to a minimum signal level) is 0.5 microseconds. Since time-to-amplitude converter 57 does not begin to operate until the trailing edge of the output pulse from multivibrator 56 is detected and ceases to operate with the generation of the next TR pulse, it is apparent that were the multivibrator pulse width equal to 0.5 microseconds, the output of converter 57 would contain no offset, that is, the 0.5 microsecond offset in the recording would be cancelled. The output of the converter would not start to increase until the start of the "true" sample on the disc passes underneath the record/read head. The output of the converter would vary between zero and that level corresponding to a "true" sample width of 1 microsecond (a recorded sample width of 1.5 microseconds). However, there is a danger in allowing the period of multivibrator 56 to equal 0.5 microseconds. Consider what would happen in the case of a minimum width sample (0.5 microseconds) if for one reason or another the pulse width of multivibrator 56 should increase slightly beyond 0.5 microseconds. In such a case, the TR pulse which should stop the growth of the ramp at the output of the converter would be applied to the stop input before a negative step would be applied to the start input. This would result in a sample with an erroneously large amplitude being outputted in the audio output stream. To guard against this erroneously large output from the converter in the case of minimal-width samples, the period of operation of multivibrator 56 is made slightly shorter than 0.5 microseconds. Of course, with a 0.4 microsecond period, it is apparent that the actual output of converter 57 for each sample is greater than it should be for the actual signal level by the amount that the ramp grows in 0.1 microsecond. This means that every output from sample hold circuit 58 is greater than it should be by the amount that the ramp grows in 0.1 microseconds. However, since the increased amplitude of each sample is greater than it should be by a constant value, the offset is eliminated by capacitor 131 and resistor 132. The capacitor simply blocks the DC component of the changing signal at the output of sample hold circuit 58 from reaching low-pass filter 59. In fact, all output from sample hold circuit 58 are positive since the initial signal before recording is offset by one unit as shown in FIG. 2. Capacitor 131 blocks the DC component of the resulting signal at the output of sample hold circuit 58 so that the average value of the signal transmitted to low-pass filter 59 is zero. Capacitor 131 thus eliminates all DC components from the output of sample hold circuit 58.

The output of sample hold circuit 58 consists of a series of DC levels, the output changing approximately every 200 microseconds. The unwanted high frequency components in the output signal are filtered by filter 59 in a manner well known in the art. With the high-frequency components removed, the signal appearing on channel OC1 is the same as the signal originally used during the recording process.

At the end of the pass of each segment underneath the record/read head, stream counter 62 is reset by an IM pulse. Succeeding TR pulses increment the count in stream counter 62 until comparator 62 energizes its AR output. This is an indication that the next sample should be processed. The same numbered sample is read in each segment during each pass of the disc underneath the record/read head. At the end of each pass, the ZTR2 pulse extended through gates 55 and 61 increments stream select buffer counter 64 so that the 167 samples in the next information stream are read during the next revolution of the disc.

At the same time, each ZTR2 pulse after the first appearing on conductor IB (the output of gate 61) causes the count in signal length buffer counter 49 to be decremented. This counter initially represents the total number of information streams to be processed. At the end of each pass, the count in counter 49 decreases by unity. After the correct number of information streams have been processed, signal length buffer counter 49 contains a count of zero. Zero detector 50 causes conductor Z to go high which in turn resets busy flip-flop 60. Conductor B goes low to disable gate 51 so that no further signals appear on output channel OC1 and also to inform signal select control unit 102 that the decoder has completed it outputting of the selected word. When conductor Z goes high, inverter 137 causes conductor $\overline{Z}$ to go low. This inhibits further operation of gate 55 so that subsequent ZTR2 pulses do not set busy flip-flop 60 in the 1 state. It is only after signal length buffer counter 49 is once again loaded (together with track select buffer 47 and stream select buffer counter 64) and conductor $\overline{L}$ goes high that gate 55 can operate once again to start the out-putting of a new signal when the first ZTR2 pulse is received.

In a typical computer-controlled peripheral unit of any type, the peripheral unit generally requests service by appropriately energizing one of the inputs to the computer. The computer then responds by transmitting the necessary data to the peripheral unit. After the peripheral unit operates upon this data and requires further service, another request is made of the computer for such service. This type of operation lends itself to the injection of pauses in the audio response system of my invention.

Suppose the signal select control unit 102 is programmed such that after the outputting of a particular word a pause of a predetermined duration is required. In such a case, at the end of the outputting of the word, conductor B goes low to inform the signal select control unit that the decoder is now free to be given new information. The computer could theoretically wait for a time interval equal to the required pause until it transmits a new set of data to the decoder. However, this would require additional monitoring circuits within the computer. A far easier way to inject the pause is for interface equipment between the computer and the decoder to pulse conductor $\overline{SL}$ low at the same time that it loads signal length buffer counter 49 with an appropriate number, all under computer control. With conductor $\overline{SL}$ low at the same time that conductor $\overline{L}$ goes low to control loading, "silence" buffer 141 is loaded such that conductor $\overline{SIL}$ goes low. Gate 51 cannot operate and there is no outputting of a signal on channel OC1. It does not matter how track select buffer 47 and stream select buffer counter 64 are loaded; since there is no output, it does not matter which pre-recorded track is read or which information streams in that track are identified. After each rotation of the disc, however, conductor IB is pulsed and signal length buffer counter 49 is decremented. Suppose the number 10 is loaded into this counter. Since it takes 33⅓ milliseconds for one rotation of the disc, zero detector 50 does not energize conductor Z unitl ⅓-second has elapsed subsequent to the loading of counter 49 and the deenerization of conductor $\overline{SIL}$. When counter 49 is first loaded, the first ZTR2 pulse transmitted to gate 55 sets busy flip-flop 60 in the 1 state to inform the signal select control unit 102 that the decoder is busy. After ⅓-second, when conductor Z goes high, busy flip-flop 60 is reset and conductor B goes low. This informs the interface equipment that the decoder is ready for the outputting of a new signal and that the interface equipment should generate a program interrupt for transmission to the computer. In this manner, once the computer determines the length of a required pause and loads signal length buffer counter 49 appropriately, the computer need exercise no further control over the pause generation; when conductor B goes low once again, the computer proceeds to load units 47, 49 and 64 with the data necessary to output the next word, with conductor $\overline{SL}$ remaining high this time so that buffer 141 will keep conductor $\overline{SIL}$ high.

It was mentioned above that it is possible to control outputting of a partial word. For example, if the word "account" is stored in several successive information streams on a track, it is possible to control the outputting of the word "count" simply by appropriately loading counters 49 and 64. For example, suppose that the word "account" is contained in information streams 11–19 of a particular track. Ordinarily, in order to output the complete word, the number 10 is loaded into counter 64 and the number 9 is loaded into counter 49. Before the word "count" can be read out automatically, some experimentation will usually be necessary. As a first try, it might be felt that the word "count" might begin in information stream 12. In such a case, counter 64 would be loaded with the number 11 and counter 49 would be loaded with the number 8. If part of the "*a*" is heard, then on the next try counter 64 would be loaded with the number 12 and counter 49 would be loaded with the number 7. This experimentation can continue until the information stream to begin outputting of the word "count" is determined. Thereafter, the word can be selected automatically by signal selector control unit 102 by loading the experimentally determined address information in the buffer counters. Since one revolution of the disc requires only 33.3 milliseconds, it si apparent that the largest is error" in the outputting of a partial word is 33.3 milliseconds. In the selected example, the tail end of the word "*a*" would be heard before the word "count" or the beginning portion of the word "count" would be clipped. The disc rotates at such a fast speed, however, that the "error" is not usually perceivable in the case of audio signals.

By utilizing a separate timing track, the overall audio response system is less complex in several respects than that disclosed in the Emerson et al application. Most important is the fact that each decoder does not require two one-shot multivibrators (133 and 134) as depicted in FIG. 6. In setting up any system, individual adjustments are generally required for every one-shot element. In a 5-line system, for example, 100 adjustments are "saved" by providing a separate timing track shared by all decoders and to which all signal tracks are synchronized.

Although the invention has been described with reference to a particular embodiment, it is to be understood that this embodiment is merely illustrative of the application of the principles of the invention. For example, it is certainly possible to use two timing tracks rather than a single timing track, in which case one timing track might have recorded in it the zero phase mark and the other might have recorded in it the index marks. Thus numerous modifications may be made in the illustrative embodiment of the invention and other arrangments may be devised without departing from the spirit and scope of the invention.

What I claim is:

1. A system for recording and reproducing analog signals comprising a record medium, first means for recording timing signals on at least a first track of said record medium, second means for reading timing signals on said first track, third means for recording items of data on at least a second track of said record medium, fourth means for reading items of data on said second track, means for continuously moving said record medium at a speed such that each of successive passes of said record medium takes place in a time interval substantially shorter than the duration of a typical analog signal to be recorded on or reproduced from said record medium, means for periodically sampling the analog signal to be recorded at a rate sufficient to enable the proper reconstruction thereof, means for controlling said third means in response to signals from said second and fourth means to record items of data on said second track representative of temporally successive samples taken by said sampling means while said record medium moves, all of the items of data representative of temporally successive samples of the analog signal being recorded in an interlaced format on said second track during successive passes of said record medium by said third means, means for operating in conjunction with timing signals read from said first track by said second means for controlling the retrieval of items of data read from said record medium by said fourth means in the same temporal sequence in which the items of data represent temporally successive samples of the analog signal, and means for reconstructing the analog signal from the retrieved items of data.

2. A system for recording and reproducing analog signals in accordance with claim 1 wherein each of said first and second tracks is divided into a plurality of segments and said record controlling means causes items of data representative of temporally successive samples to be recorded in successive segments in said second track during each pass of said record medium by said third means with successive items of data in each segment being recorded one after the other in the same order as the respective samples are taken during successive passes of such segment by said third means.

3. A system for recording and reproducing analog signals in accordance with claim 2 further including means for initiating the operation of said sampling means responsive to the passing of all items of data already recorded in any segment in said second track by said third means.

4. A system for recording and reproducing analog signals in accordance with claim 3 wherein said record controlling means includes means for converting the amplitude of each sample taken by said sampling means to a corresponding pulse width, and each item of data recorded in said second track is a pulse whose width corresponds to the amplitude of the respective sample.

5. A system for recording and reproducing analog signals in accordance with claim 2 wherein said retrieval controlling means includes register means for identifying the same-positioned item of data in each segment in said second track during any pass of said record medium by said fourth means, means for retrieving the identified item of data in each segment as the segment passes by said fourth means, and means responsive to timing signals read from said first track for governing said register means to identify successively positioned items of data during successive passes of said record medium by said fourth means.

6. A system for recording and reproducing analog signals in accordance with claim 2 wherein said record controlling means causes items of data representative of samples of each analog signal to be recorded in an interlaced format in said second track with groups of items of data representative of samples of different analog signals being similarly recorded in an interlaced format in said second track.

7. A system for recording and reproducing analog signals in accordance with claim 6 wherein all of the same-positioned items of data in said segments constitute an information stream with successive information streams being identified by a numerical sequence determined by the order in which the items of data constituting the information streams were recorded, and said retrieval controlling means includes means responsive to timing signals read from said first track for identifying a group of successively numbered information streams containing the samples of a selected signal and for retrieving successive items of data from all of the identified information streams in numerical sequence.

8. A system for recording and reproducing analog signals in accordance with claim 1 wherein said record controlling means causes items of data representative of samples of each analog signal to be recorded in an interlaced format in said second track with groups of items of data representative of samples of different analog signals being similarly recorded in an interlaced format in said second track.

9. A system for recording and reproducing analog signals in accordance with claim 8 wherein said analog signals are audio signals, said sampling frequency is no greater than 30 KHz and each of the successive passes of said record medium takes place in substantially less time than that required to speak a typical word.

10. A system for recording and reproducing analog signals in accordance with claim 1 wherein timing signals and items of data are recorded on said record medium in two polarities and said first track includes a first timing signal indicative of the start of the track and a plurality of second timing signals dividing said first and second tracks into a plurality of segments, said record controlling means causes pulses of opposite polarities to be recorded in succession in each segment of said second track with the width of each pulse corresponding to the amplitude of the respective sample of the analog signal being recorded, one such pulse being recorded during each pass of any segment by said third means, said record controlling means includes means coupled to said fourth means for counting the number of polarity transitions in each segment of said second track as such segment passes by said fourth means for determining the time of operation of said sampling means, said retrieval controlling means includes means for counting the number of polarity transitions in each segment of said second track as such segment passes by said fourth means to determine the item of data in each segment to be operated upon during the pass of the segment by said fourth means, each of said record controlling means and said retrieval controlling means including means for determining the number of polarity transitions to be counted in accordance with the number of said first timing signals read from said first track, and said reconstructing means includes means for converting the time interval between the two polarity transitions which define the item of data being operated upon to a signal level and means for smoothing successive signal levels.

11. A system for recording and reproducing analog signals in accordance with claim 1 wherein said first track includes a first timing signal indicative of the start of the track and a plurality of second timing signals dividing said first and second tracks into a plurality of segments, said record controlling means causes items of data representative of successive samples to be recorded in successive segments during each pass of said second track by said third means with successive items of data in each segment being recorded one after the other in the same order as the respective samples are taken during successive passes of such segment by said third means, all of the same-positioned items of data in said segments constituting an information stream, with all of the information streams being ordered in accordance with the sequence in which the items of data therein were recorded, and said retrieval controlling means includes means for identifying a single information stream during each pass of said second track by said fourth means, means responsive to a second timing signal being read from said first track for thereafter counting the items of data in each segment as such segment passes by said fourth means until a selected item of data is reached which is contained within the identified information stream, means for operating upon such selected item of data, means responsive to a first timing signal being read from said first track for changing the identified information stream, and means for inhibiting the operation of said retrieval controlling means after all the information streams containing items of data of the analog signal to be reproduced have been identified by said identifying means and the items of data therein have been operated upon.

12. A system for recording and reproducing analog signals in accordance with claim 11 wherein each item of data recorded in said second track is a pulse whose width corresponds to the amplitude of the respective sample taken by said sampling means and said sampling rate varies from segment to segment in accordance with the sum of all pulse widths in successive segments.

13. A system for recording and reproducing analog signals in accordance with claim 1 wherein each of said first and second tracks is divided into a plurality of segments with said first track having a timing signal associated with each segment, a single item of data representative of a sample being recorded in sequence in each of the segments of said second track with successive items of data in each segment being recorded one after the other in the same order as the respective samples are taken during successive passes of such segment by said third means, said items of data being in the form of pulses on said record medium, and said first track has a timing signal which is distinguishable from the timing signals associated with said segments and which identifies the start of said first and second tracks.

14. A system for recording items of data representative of samples of at least two separately recognizable analog signals on a record medium such that temporally successive represented samples of analog signals to be reproduced therefrom are represented in an interlaced format, each of said analog signals having samples which are to be independently retrievable as a group without the others from said record medium, comprising means for recording timing signals on at least a first track of said record medium and for recording items of data on at least a second track of said record medium, means for continuously moving said record medium past said recording means at a speed such that each of successive passes of said record medium by said recording means takes place in a time interval substantially shorter than the duration of a typical analog signal whose respective samples are to be recorded on said record medium, means for periodically sampling an analog signal to be recorded at a rate sufficient to enable the proper reconstruction thereof, means for controlling said recording means to record items of data on said second track representative of temporally successive samples taken by said sampling means, all of the items of data representative of temporally successive samples of each analog signal being recorded in an interlaced format on said second track with groups of items of, data representative of samples of different analog signals being recorded in an interlaced format on said second track, and means for representing the positions on said second track of the items of data included in each independently retrievable group contained in said interlaced format.

15. A system for recording analog signals in accordance with claim 14 wherein said tracks divided into a plurality of segments and said record controlling means causes items of data representative of temporally successive samples to be recorded in successive segments of said second track during each pass of said record medium by said recording means with successive items of data in each segment being recorded one after the other in the same order as the respective samples are taken during successive passes of such segment by said recording means, said record controlling means including means for reading timing signals recorded in said first track to identify successive segments in said second track. 16. A system for recording analog signals in accordance with claim 15 further including means for intiating the recording of an item of data responsive to the passing of all items of data already recorded in any segment by said recording means.

17. A system for recording analog signals in accordance with claim 16 wherein said record controlling means includes means for converting the amplitude of each sample taken by said sampling means to a corresponding pulse width, and each item of data recorded on said second track is a pulse whose width corresponds to the amplitude of the respective sample.

18. A system for recording analog signals in accordance with claim 15 wherein each item of data recorded on said second track is a pulse whose width corresponds to the amplitude of the respective sample taken by said sampling means.

19. A system for recording analog signals in accordance with claim 15 wherein said analog signals are audio signals, said sampling frequency is no greater than 30 kHz and each of the successive passes of said record medium by said recording means takes place is substantially less time than that required to speak a typical word.

20. A system for recording analog signals in accordance with claim 14 wherein timing signals and items of data are recorded on said record medium in two polarities and each of said tracks is divided into a plurality of segments, said record controlling means causes pulses of opposite polarities to be recorded in succession in each segment of said second track with the width of each pulse corresponding to the amplitude of the respective sample of the analog signal being recorded, one such pulse being recorded during each pass of any segment of said second track by said recording means, and said record controlling means includes means coupled to said recording means for counting the number of polarity transitions in each segment as such segment passes by said recording means for determining the time when an item of data is recorded.

21. A system for recording analog signals in accordance with claim 20 wherein said record controlling means includes means responsive to the timing signals recorded in said first track for re-starting the operation of said counting means.

22. A system for recording analog signals in accordance with claim 21 wherein all of the same-positioned pulses in said segments of said second track constitute an information stream, and further including means for identifying successive information streams by a numerical sequence determined by the order in which the items of data constituting the information streams are recorded.

23. A system for recording analog signals in accordance with claim 14 wherein said record medium is capable of storing two types of signals of opposite polarities, and said record controlling means includes means for identifying a plurality of segments in said second track in accordance with the timing signals recorded in said first track, means for controlling the recording of successive opposite polarity pulses in each of said segments in said second track with a single pulse being recorded in each segment during each pass of said record medium by said recording means, means for detecting a transition in the polarity of a sgement of said second track as it passes by said recording means, means for writing a pulse of either polarity in said second track, means for enabling said writing means to write pulses of alternating polarities as transitions in the polarity of said second track are detected, and means for turning on said writing means so that it writes a pulse of the polarity in which it has been enabled after all the previously recorded pulses in a segment of said second track have passed by said recording means and another pulse is to be recorded.

24. A system for recording analog signals in accordance with claim 23 wherein said record controlling means causes said first track to be divided into a plurality of segments by the timing signals recorded therein, said second track having a plurality of segments each associated with a respective segment of said first track, and means for controlling the writing of a pulse on said first track which is distinguishable from all other timing signals in front of the first segment on said first track to identify the start of a new pass of said record medium by said recording means.

25. A system for recording analog signals in accordance with claim 14 wherein said record controlling means causes said first track to be divided into a plurality of segments by the timing signals recorded therein, said second track having a plurality of segments each associated with a respective segment of said first track, and means for controlling the writing of a pulse on said first track which is distinguishable from all other timing signals in front of the first segment on said first track to identify the start of a new pass of said record medium by said recording means.

26. A system for reproducing analog signals comprising a record medium having timing signals recorded in at least a first track thereof and items of data recorded in at least a second track thereof, all of the items of data being representative of samples of analog signals and being recorded in an interlaced format on said second track, reading means, means for continuously moving said record medium past said reading means at a speed such that each of successive passes of said record medium by said reading means takes place in a time interval shorter than the duration of a typical analog signal to be reproduced from said record medium, means for operating in conjunction with timing signals read from said first track for controlling the periodic retrieval of less than all of the items of data in said interlaced format from said second track during multiple passes of said record medium by said reading means in a sequence corresponding to the temporally successive samples of a selected analog signal to be reproduced, and means for reconstructing the selected analog signal from the retrieved items of data.

27. A system for reproducing analog signals in accordance with claim 26 wherein said second track is divided into a plurality of segments and successive items of data representative of temporally successive samples of an analog signal are recorded in successive segments of said second track with successive items of data in each segment following each other in the same order as the respective samples of the analog signal.

28. A system for reproducing analog signals in accordance with claim 26 wherein said items of data recorded on said second track are pulses whose widths are related by a continuous function to the amplitude of said signals.

29. A system for reproducing analog signals in accordance with claim 27 wherein said retrieval controlling means includes register means for identifying the same-positioned item of data in each segment of said second track during any pass of said record medium by said reading means, means for retrieving the identified item of data in each segment as the segment passes by said reading means, and means responsive to timing signals read from said first track for governing said register means to identify successively positioned items of data during successive passes of said record medium by said reading means.

30. A system for reproducing analog signals in accordance with claim 29 wherein each item of data recorded on said second track is a pulse whose width corresponds to the amplitude of the respective sample, and said reconstructing means includes means for converting the width of each pulse retrieved from said second track to a signal level and means for smoothing successive signal levels.

31. A system for reproducing analog signals in accordance with claim 27 wherein the items of data representative of samples of each analog signal are recorded in an interlaced format on said second track with groups of items of data representative of samples of different analog signals being similarly recorded in an interlaced format on said second track.

32. A system for reproducing analog signals in accordance with claim 27 wherein all of the same-positioned items of data in the segments of said second track constitute an information stream with successive information streams being identified by a numerical sequence determined by the order in which the items of data constituting the information streams represent sequential samples, said retrieval controlling means includes means for identifying a group of successively numbered information streams containing the samples of a selected signal and said retrieving means retrieves successive items of data from all of the identified information streams in numerical sequence.

33. A system for reproducing analog signals in accordance with claim 32 wherein the items of data representative of samples of each analog signal are recorded in an interlaced format on said second track with groups of items of data representative of samples of different analog signals being similarly recorded in an interlaced format on said second track.

34. A system for reproducing analog signals in accordance with claim 27 wherein the timing signals recorded in said first track include a first timing signal indicative of the start of said second track and a plurality of second timing signals each indicative of the start of a respective segment of said second track.

35. A system for reproducing analog signals in accordance with claim 34 wherein said retrieval controlling means includes register means for identifying the number of the sample in each segment of said second track to be retrieved as said segment moves past said reading means, and means for incrementing the count represented by said register means responsive to the reading of said first timing signal.

36. A system for reproducing analog signals in accordance with claim 35 wherein said retrieval controlling means further includes means for counting the samples in each segment of said second track as it moves past said reading means, means for comparing the count represented in said counting means to the count represented in said register means for identifying the sample in each segment of said second track to be retrieved, and means for resetting said counting means responsive to the reading of a second timing signal.

37. A system for reproducing analog signals in accordance with claim 36 wherein timing signals and items of data are recorded on said record medium in two polarities with pulses of opposite polarities being recorded in succession in each segment of said second track and with the width of each pulse corresponding to the amplitude of the respective sample of the analog signal, said retrieval controlling means retrieves one pulse during each pass of any segment by said reading means and includes means for counting the number of polarity transitions in each segment as such segment passes by said reading means to determine the item of data in each segment to be operated upon during the pass of the segment by said reading means, and said reconstructing means includes means for converting the time interval between the two polarity transitions which define the item of data being operated upon to a signal level and means for smoothing successive signal levels.

38. A system for reproducing analog signals in accordance with claim 34 wherein timing signals and items of data are recorded on said record medium in two polarities with pulses of opposite polarities being recorded in succession in each segment of said second track and with the width of each pulse corresponding to the amplitude of the respective sample of the analog signal, said retrieval controlling means retrieves one pulse during each pass of any segment by said reading means and includes means for counting the number of polarity transitions in each segment as such segment passes by said reading means to determine the item of data in each segment to be operated upon during the pass of the segment by said reading means, and said reconstructing means includes means for converting the time interval between the two polarity transitions which define the item of data being operated upon to a signal level and means for smoothing successive signal levels.

39. A system for reproducing analog signals in accordance with claim 27 wherein timing signals and items of data are recorded on said record medium in two polarities with pulses of opposite polarities being recorded in succession in each segment of said second track and with the width of each pulse corresponding to the amplitude of the respective sample of the analog signal, said retrieval controlling means retrieves one pulse during each pass of any segment by said reading means and includes means for counting the number of polarity transitions in each segment as such segment passes by said reading means to determine the item of data in each segment to be operated upon during the pass of the segment by said reading means, and said reconstructing means includes means for converting the time interval between the two polarity transitions which define the item of data being operated upon to a signal level and means for smoothing successive signal levels.

40. A system for reproducing analog signals in accordance with claim 27 wherein said second track is divided into a plurality of segments with a single item of data representative of a sample being retrieved in sequence from each of said segments as said segments pass by said reading means with successive items of data in each segment being retrieved during successive passes of such segment by said reading means, said items of data being in the form of pulses on said record medium, and said first track has recorded thereon a timing signal for identifying the start of a new pass of said record medium by said reading means.

41. A system for reproducing analog signals in accordance with claim 40 wherein said first track has recorded thereon a timing signal for identifying the start of the passing of each segment of said second track by said reading means.

42. A record medium having at least two tracks; on a first of which are stored a plurality of samples $A_{ij}$ of an analog signal, where $i$=1,2,3,...N and $j$=1,2,3,...M, and the samples of said analog signal have a time sequence $A_{11}$, $A_{12}$, $A_{13}$,...$A_{1M}$, $A_{21}$, $A_{22}$, $A_{23}$,...$A_{2M}$, $A_{31}$, $A_{32}$, $A_{33}$,...$A_{3M}$,...$A_{N1}$, $A_{N2}$, $A_{N3}$,...$A_{NM}$ and are stored on said first track in a spatial sequence $A_{11}$, $A_{21}$, $A_{31}$,... $A_{N1}$, $A_{12}$, $A_{22}$, $A_{32}$,...$A_{N2}$, $A_{13}$, $A_{23}$, $A_{33}$,...$A_{N3}$,...$A_{1M}$, $A_{2M}$, $A_{3M}$,...$A_{NM}$; and on a second of which are stored timing signals for identifying successive spatial sequences $A_{1-1}$–$A_{N1}$, $A_{12}$–$A_{N2}$, $A_{13}$–$A_{N3}$,...$A_{1M}$–$A_{NM}$; said record medium beinng characterized in that during normal reading of information therefrom all of the recorded information can be read in a time substantially sjorter than the duration of a typical analog signal whose samples are stored therein, and being further characterized in that samples of said analog signal are stored in the form of pulses whose widths are related by a continuous function to the amplitude of the analog signal and the trailing edges of substantially all of said pulses are the leading edges of respective succeeding pulses.

43. A record medium in accordance with claim 42 wherein said samples are stored in said first track in the form of a closed loop with sample $A_{11}$ following sample $A_{NM}$.

44. A record medium in accordance with claim 43 wherein the same distance on the first track separates every pair of sample $A_{1j}$ and $A_{1,j+1}$.

45. A record medium in accordance with claim 43 wherein each sample in said first track is stored in one of two states and each spatial sample sequence $A_{1j}$, $A_{2j}$, $A_{3j}$,..., $A_{Nj}$ consists of samples stored in alternating, opposite states.

46. A record medium in accordance with claim 43 wherein a start-of-pass distinguishing timing signal is stored on said second track at a position corresponding to a position on said first track separating samples $A_{NM}$ and $A_{11}$.

47. A record medium in accordance with claim 42 wherein a start-of-pass distinguishing timing signal is stored on said second track at a position corresponding to a position on said first track separating samples $A_{NM}$ and $A_{11}$.

48. A record medium in accordacne with claim 42 wherein each sample in said first track is stored in one of two states and each spatial sample sequence $A_{1j}$, $A_{2j}$, $A_{3j}$,...$A_{Nj}$ consists of samples stored in alternating, opposite states.

49. A record medium in accordance with claim 48 wherein the same distance on the first track separates every pair of samples $A_{1j}$ and $A_{1,j+1}$.

50. A record medium having at least two tracks; on a first of which are stored a plurality of samples $A_{ij}$, $B_{kj}$ of at least two analog A and B, where $i$=1,2,3,...N, $k$=1,2,3,...L, and $j$=1,2,3,...M, the samples of analog signal A have a time sequence $A_{11}$, $A_{12}$, $A_{13}$,...$A_{1M}$, $A_{21}$, $A_{22}$, $A_{23}$,...$A_{2M}$, $A_{31}$, $A_{32}$, $A_{33}$,...$A_{3M}$,...$A_{N1}$, $A_{N2}$, $A_{N3}$, ...$A_{NM}$ and the samples of analog signal B have a time sequence $B_{11}$, $B_{12}B_{13}$,...$B_{1M}$, $B_{21}$, $B_{22}$, $B_{23}$,...$B_{2M}$, $B_{31}$, $B_{32}$, $B_{33}$,... $B_{3M}$,...$B_{L1}$, $B_{L2}$, $B_{L3}$,...$B_{LM}$, and the samples are stored on said first track in a spatial sequence $A_{11}$, $A_{21}$, $A_{31}$,...$A_{N1}$, $B_{11}$, $B_{21}$, $B_{31}$,...$B_{L1}$, $A_{12}$, $A_{22}$, $A_{32}$,...$A_{N2}$, $B_{12}$,$B_{22}$, $B_{32}$,...$B_{L2}$, $A_{13}$, $A_{23}$, $A_{33}$,...$A_{N3}$, $B_{13}$, $B_{23}$, $B_{33}$,...$B_{L3}$,...$A_{1M}$, $A_{2M}$, $A_{3M}$,...$A_{NM}$, $B_{1M}$, $B_{2M}$, $B_{3M}$,...$B_{LM}$; and on a second of which are stored timing signals for identifying successive spatial sequences $A_{11}$–$B_{L1}$, $A_{12}$–$B_{L2}$, $A_{13}$–$B_{L3}$,...$A_{1M}$–$B_{LM}$; each of said analog signals having samples which are to be independentaly read as a group from said record medium; said record medium being characterized in that during normal reading of information therefrom all of the recorded information can be read in a time substantially shorter than the duration of a typical analog signal whose samples are stored therein and being adapted for use with means for reading therefrom the samples in only a selected group independent of the samples in any other group.

51. A record medium in accordance with claim 50 wherein said samples are stored in said first track in the form of a closed loop with sample $A_{11}$ following sample $B_{LM}$.

52. A record medium in accordance with claim 51 wherein each of said samples is stored in the form of a pulse whose width corresponds to the amplitude of the respective analog signal.

53. A record medium in accordance with claim 52 wherein the same distance on the first track separates every pair of samples $A_{1j}$ and $A_{1j+1}$.

54. A record medium in accordance with claim 52 wherein each sample in said first track is stored in one of two states and each spatial sample sequence $A_{1j}$, $A_{2j}$, $A_{3j}$,... $A_{Nj}$, $B_{1j}$, $B_{2j}$, $B_{3j}$,...$B_{Lj}$ consists of samples stored in alternating, opposite states.

55. A record medium in accordance with claim 52 wherein a start-of-pass distinguishing timing signal is stored on said second track at a position corresponding to a position on said first track separating samples $B_{LM}$ and $A_{11}$.

56. A record medium in accordance with claim 50 wherein a start-of-pass distinguishing timing signal is stored on said second track at a position corresponding to a position on said first track separating samples $B_{LM}$ and $A_{11}$.

57. A record medium in accordance with claim 50 wherein each sample in said first track is stored in one of two states and each spatial sample sequence $A_{1j}$, $A_{2j}$, $A_{3j}$,... $A_{Nj}$, $B_{1j}$, $B_{2j}$, $B_{3j}$,...$B_{Lj}$ consists of samples stored in alternating, opposite states.

58. A record medium in accordance with claim 57 wherein the same distance on the first track separates every pair of samples $A_{1j}$ and $A_{1j+1}$.

59. A record medium in accordance with claim 58 wherein each of said samples on the first track is stored in the form of a pulse whose width corresponds to the amplitude of the respective analog signal.

60. A method for recording on a record medium at least two separately recognizable analog siganals, each of said analog signals being characterized in that it is to be independently retreivable from said record medium, comprising the steps of:

1. recording timing signals on at least a first track and items of data on at least a second track of said record medium as it is moved continuously at a speed such that each complete pass of said record medium takes place in a time interval substantially shorter than the duration of a typical analog signal to be recorded on said record medium.
2. periodically sampling each analog signal to be recorded at a rate sufficient to enable the proper reconstruction thereof,
3. controlling the recording of items of data on said second track representative of temporally successive samples while said record medium moves, all of the items of data representative of the samples taken of each analog signal being recorded in an interlaced format on said second track with groups of items of data representative of samples of different analog signals being recorded in an interlaced format on said second track; and
4. registering the positions on said second track of the items of data included in each independently retrievable group contained in said interlaced format.

61. A method for recording analog signals in accordance with claim 60 wherein said tracks are divided into a plurality of segments and in step (1) successive segments of said second track are identified by timing signals read from said first track and items of data representative of temporally successive samples are recorded in successive segments during each pass of said record medium with successive items of data in each segment being recorded one after the other in same order as the respective samples are taken during successvie passes of such segment.

62. A method for recording analog signals in accordance with claim 61 wherein the recording of an item of data in step (1) is initiated responsive to the passing of all items of data already recorded in any segment.

63. A method for recording analog signals in accordance with claim 62 wherein in step (3) the amplitude of each sample taken during step (2) is converted to a corresponding pulse width, and each item of data recorded on said second track is a pulse whose width corresponds to the amplitude of the respective sample.

64. A method for recording analog signals in accordance with claim 61 wherein each item of data recorded on said second track in step (1) is a pulse whose width corresponds to the amplitude of the respective sample taken during step (2).

65. A method for recording analog signals in accordance with claim 61 wherein said analog signals are audio signals, said sampling frequency is no greater than 30 kHz and each of the successive passes of said record medium takes place in substantially less time than that required to speak a typical word.

66. A method for recording analog signals in accordance with claim 60 wherein timing signals and items of data are recorded on said record medium in two polarities in step (1) and each of said tracks is divided into a plurality of segments, pulses of opposite polarities being recorded in succession in each segment of said second track with the width of each pulse corresponding to the amplitude of the respective sample of the analog signal taken in step (2), one such pulse being recorded during each pass of any segment of said second track, and in step (3) the number of polarity transitions in each segment of said second track as such segment moves is counted for determining when an item of data is recorded in step (1).

67. A method for recording analog signals in accordance with claim 66 wherein the counting of polarity transitions in step (3) is re-started responsive to timing signals recorded in said first track.

68. A method for recording analog signals in accordance with claim 67 wherein all of the same-positoned pulses in said segments of said second track constitute an information stream, and in step (3) successive information streams are identified by a numerical sequence determined by the order in which the items of data constituting the information streams are recorded.

69. A method for recording analog signals in accordance with claim 60 wherein said first track is divided into a plurality of segments by the timing signals recorded therein and said track has a plurality of segments each associated with a respective segment of said first track, and further including the step of writing a pulse on said first track which is distinguishable from all other timing signals in front of the first segment on said first track to identify the start of a new pass of said record medium.

70. A method for reproducing analog signals from groups of items of data recorded on a record medium having timing signals recorded on at least a first track thereof and items of data recorded on at least a second track thereof, all of the items of data in each group being representative of samples of a respective independently retrievable analog signal and being recorded in an interlaced format on said second track, with the items of data of all groups being recorded in an interlaced format, comprising the steps of:

1. continuously moving said record medium at a speed such that each complete pass of said record medium takes place in a time interval shorter than the duration of a typical analog signal to be reproduced from said record medium,
2. identifying a group of items of data corresponding to a selected analog signal to be reproduced,
3. periodically retrieving the items of data in only the identified group from said second track during multiple passes of said record medium in a sequence corresponding to the positions of timing signals in said first track and the temporally successive samples of the selected analog signal to be reproduced, and
4. reconstructing the selected analog signal from the retrieved items of data.

71. A method for reproducing analog signals in accordance with claim 70 wherein said second track is divided into a plurality of segments and successive items of data representative of temporally successive samples of an analog signal are recorded in successive segments of said second track with successive items of data in each segment following each other in the same order as the respective samples of the analog signal.

72. A method for reproducing analog signals in accordance with claim 71 wherein each item of data recorded on said second track is a pulse whose width corresponds to the amplitude of the respective sample.

73. A method for reproducing analog signals in accordance with claim 71 wherein step (3) includes the substep of identifying the same-positioned item of data in each segment of said second track during any pass of said record medium, retrieving the identified item of data in each segment as the segment moves, and causing successively positioned items of data to be identified during successive passes of said record medium in accordance with the positions of timing signals in said first track.

74. A method for reproducing analog signals in accordance with claim 73 wherein each item of data recorded on said second track is a pulse whose width corresponds to the amplitude of the respective sample, and in step (4) the width of each pulse retrieved from said second track is converted to a signal level and successive signal levels are smoothed.

75. A method for reproducing analog signals in accordance with claim 71 wherein all of the same-positioned items of data in the segments of said second track constitute an information stream with successive information streams being identified by a numerical sequence determined by the order in which the items of data constituting the information streams represent sequential samples, and in step (3) a group of successively numbered information streams containing the samples of a selected signal are identified and successive items of data from all of the identified information streams are retrieved in numerical sequence.

76. A method for reproducing analog signals in accordance with claim 70 wherein items of data are recorded on said second track in two polarities and said second track is divided into a plurality of segments with pulses of opposite polarities being recorded in succession in each segment and with the width of each pulse corresponding to the amplitude of the respective sample of the analog signal, in step (3) one pulse is retrieved during each pass of any segment, step (3) including the sub-step of counting the number of polarity transitions in each segment of said second track as such segment moves to determine the item of data in each segment to be operated upon during the pass of the segment, and step (4) includes the sub-steps of converting the time interval between the two polarity transitions which define the item of data being operated upon to a signal level and smoothing successive signal levels, said first track including a timing signal associated with each segment of said second track to control the restarting of the count of polarity transitions prior to the start of the pass of each segment of said second track.

77. A method for reproducing analog signals in accordance with claim 76 wherein all of the same-positioned pulses in the segments of said second track constitute an information stream, with successive information streams being identified by a numerical sequence determined by the order in which the items of data constituting the information streams correspond to successive samples, and in step (3) a group of successively numbered information streams containing the samples of a selected signal are identified by a timing signal contained in said first track to control the retrieval of successive pulses from all of the identified information streams in numerical sequence.

78. A method for reproducing analog signals in accordance with claim 70 wherin said second track is divided into a plurality of segments, items of data representative of temporally successive samples are recorded in successive segments of said second track with successive items of data in each segment being recorded one after the other in the same order as the respective samples, all of the same-positioned items of data in the segments of said second track constituting an information stream with all of the information streams being ordered in accordance with the sequence in which the items of data correspond to respective sequential samples, and step (3) includes the sub-steps of identifying a single information stream during each pass of said record medium, counting the items of data in each segment of said second track which follow a first timing signal contained in said first track as such segment moves until a selected item of data is reached which is contained within the identified information stream, operating upon such selected item of data, changing the identified information stream following each pass of said record medium in accordance with a second timing signal contained in said first track, and inhibiting the retrieval of items of data after all of the information streams containing items of data of the analog signal to be reproduced have been identified and the items of data therein have been operated upon.

79. A method for reproducing analog signals in accordance with claim 78 wherein each item of data recorded on said second track is a pulse whose width corresponds to the amplitude of the respective sample, and the rate at which items of data are retrieved in step (3) varies from segment to segment in accordance with the sum of all pulse widths in successive segments.

80. A method for reproducing analog signals in accordance with claim 70 wherein said second track is divided into a plurality of segments, in step (3) a single item of data representative of a sample is retrieved in sequence from each of the segments of said second track as said segments move with successive items of data in each segment being retrieved during successive passes of such segment, said items of data are in the form of pulses on said record medium, and step (3) includes the sub-step of detecting a timing signal recorded in said first track to identify the start of a new pass of said record medium.

81. A method for reproducing analog signals in accordance with claim 80 wherein a plurality of timing signals are recorded in said first track each associated with one of the segments of said second track, and step (3) includes the sub1-step of detecting such timing signals to identify the start of each segment of said second track.

82. A method for reproducing analog signals in accordance with claim 80 wherein each independently retrievable analog signal is the representation of a respective speech component.

83. A method for reproducing analog signals in accordance with claim 70 wherein each independently retrievable analog signal is the representation of a respective speech component.

84. A method for reproducing analog signals in accordance with claim 83 wherein a plurality of analog signals, either the same or different, can be reproduced simultaneously for extension to output channels, outpuchannels, a respective group of items of data is identified in step (2) for each of said output channels, the items of data in only the respective identified group are retrieved in step (3) for each of said output channels, and in step (4) the respective analog signal is reconstructed for each of said output channels.

85. A method for reproducing analog signals in accordance with claim 84 wherein the respective analog signal for each of said output channels is continuously reconstructed in step (4) as successive items of data in the respective identified group are retrieved in step (3).

86. A method for reproducing analog signals in accordance with claim 70 wherein a plurality of analog signals, either the same or different, can be reproduced simultaneously for extension to different output channels, a respective group of items of data is identified in step (2) for each of said output ceannels, the items of data in only the respective identified group are retrieved in step (3) for each of said output channels, and in step (4) the respective analog signal is reconstructed for each of said output channels.

87. A method for reproducing analog signals in accordance with claim 86 wherein the respective analog signal for each of said output channels is continuously reconstructed in step (4) as successive items of data in the respective identified group are retrieved in step (3).

* * * * *

UNITED STATES PATENT OFFICE
CERTIFICATE OF CORRECTION

Patent No. 3,743,793 Dated July 3, 1973

Inventor(s) Sidney Thomas Emerson Page 1 of 4

It is certified that error appears in the above-identified patent and that said Letters Patent are hereby corrected as shown below:

Column 1, line 14, "to" should read "of".
line 66, there should be a period at end of line.

Column 5, line 11, "opeated" should be "operated".
Column 6, line 66, "becuase" should read "because".
Column 7, line 51, "puschase" should read "purchase".
Column 8, line 64, "SMV-B" should read "SWC-B".
Column 9, line 28, "SWn-A" should read "SWN-A".
Column 10, line 21, "or" second occurrence, should read "of".
line 63, "wall" should read "will".
Column 11, line 8, "milliseconds."should appear at end of line.
line 11, "per per" should read "per".
line 41, "wih" should read "with".
line 46, " shown" should appear after "40°".
Column 13, line 6, "of" should be deleted.
line 16, "inteerval" should read "interval".
line 63, "time" should appear between "a" and "equal".
Column 14, line 9, " SPM" should read "ZPM".
line 9, "Marx" should read "Mark".
line 17, "1.5-1.5" should read "0.5-1.5".
line 64, "dealy" should read "delay".

UNITED STATES PATENT OFFICE

CERTIFICATE OF CORRECTION

Patent No. 3,743,793 Dated July 3, 1973

Inventor(s) Sidney Thomas Emerson

It is certified that error appears in the above-identified patent and that said Letters Patent are hereby corrected as shown below:

Column 14, line 68, "is" should read "in".
Column 15, line 23, "is" should appear before "recorded".
line 40, "the",first occurrence, should be deleted.
Column 16, line 60, "consequently" should read "Consequently".
line 61, "extending" should read "extended".
Column 17, line 23, "gae" should read "gate".
line 39, "this" should read "This".
line 41, "rest" should read "reset".
Column 18, line 34, "in excess of" should read "less than".
Column 19, line 2, "opeates" should read "operates".
line 3, "shon" should read "shown".
line 19, "in", first occurrence, should read "is".
line 54, "by" should read "be".
Column 20, line 25, "though though" should read "though".
line 54, at the end of the line there should be added "to the Q output of one-shot multivibrator 230 over the WRITE PHASE I conductor and the third input of gate 233 is connected".
Column 21,
line 41, "a 'stream' with reference to the decod-" should be deleted.
line 42, "ers, every IM pulse resets" should be deleted.
Column 23, line 20, "the" should be deleted.
line 21, "operates since at this time conductor" should be deleted.

UNITED STATES PATENT OFFICE
CERTIFICATE OF CORRECTION

Patent No. 3,743,793 Dated July 3, 1973

Inventor(s) Sidney Thomas Emerson

It is certified that error appears in the above-identified patent and that said Letters Patent are hereby corrected as shown below:

Column 23, line 24, "thene" should read "the".
line 62, "beings" should read "begins".
line 64, "okf" should read "of".
Column 25, line 11, "sreams" should read "streams".
Column 26, line 58, "being" should read "begins".
Column 27, line 22, "of of" should read "of".
line 36, "This" should read "Thus".
Column 28, line 13, There should be a period after "taken".
Column 31, line 16, "may the" should read "may then".
Column 32, line 58, "segmant" should read "segment".
line 63, "as" should read "an".
Column 33, line 60, "steream" should read "stream".
Column 35, line 64, "output" should read "outputs".
Column 36, line 16, "comparator 62" should read "comparator 63".
Column 37, line 19, "unitl" should read "until".

line 65, "si" should read "is".
line 65, "largest is er-" should read "largest'er-".
Column 38, line 12, "5-line" should read "50-line".
Column 41, line 46, the comma should be deleted.

Column 46, line 12, "$A_{IM}$" should read "$A_{1M}$".
line 19, "beinng" should read "being".
line 21, "sjorter" should read "shorter".
line 62, "analog A" should read "analog signals A".
line 67, "$B_{12}$ $B_{13}$" should read "$B_{12}$, $B_{13}$".

UNITED STATES PATENT OFFICE
CERTIFICATE OF CORRECTION

Patent No. 3,743,793 Dated July 3, 1973

Inventor(s) Sidney Thomas Emerson

It is certified that error appears in the above-identified patent and that said Letters Patent are hereby corrected as shown below:

Column 47, line 57, "siganals" should read "signals".
line 67, the period should be a comma.
Column 48, line 26, "in" should read "in the ".
line 28, "successvie" should read "successive"
Column 49, line 11, "said track" should read "said second track"
Column 51, line 35, "sub 1-step" should read "sub-step"
Column 52, line 11, "to output channels, out-" should read "to different output channels".
line 12, "puchannels," should be deleted.
line 28, "ceannels" should read "channels"

Signed and Sealed this

Seventh Day of September 1976

[SEAL]

*Attest:*

RUTH C. MASON
*Attesting Officer*

C. MARSHALL DANN
*Commissioner of Patents and Trademarks*